United States Patent
Su et al.

(10) Patent No.: US 10,701,375 B2
(45) Date of Patent: Jun. 30, 2020

(54) ENCODING AND DECODING REVERSIBLE PRODUCTION-QUALITY SINGLE-LAYER VIDEO SIGNALS

(71) Applicant: Dolby Laboratories Licensing Corporation, San Francisco, CA (US)

(72) Inventors: Guan-Ming Su, Fremont, CA (US); Jon Scott Miller, Harleysville, PA (US); Walter J. Husak, Simi Valley, CA (US); Yee Jin Lee, San Jose, CA (US); Harshad Kadu, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/087,241

(22) PCT Filed: Mar. 22, 2017

(86) PCT No.: PCT/US2017/023543
§ 371 (c)(1),
(2) Date: Sep. 21, 2018

(87) PCT Pub. No.: WO2017/165494
PCT Pub. Date: Sep. 28, 2017

(65) Prior Publication Data
US 2019/0110054 A1   Apr. 11, 2019

Related U.S. Application Data

(60) Provisional application No. 62/427,532, filed on Nov. 29, 2016, provisional application No. 62/312,450, filed on Mar. 23, 2016.

(51) Int. Cl.
*H04N 19/186*   (2014.01)
*H04N 19/176*   (2014.01)
(Continued)

(52) U.S. Cl.
CPC .......... *H04N 19/186* (2014.11); *G06T 5/008* (2013.01); *H04N 1/6058* (2013.01);
(Continued)

(58) Field of Classification Search
CPC .. H04N 19/186; H04N 19/117; H04N 19/154; H04N 19/80; H04N 19/176;
(Continued)

(56) References Cited

U.S. PATENT DOCUMENTS 8,811,490 B2   8/2014   Su
9,264,681 B2   2/2016   Gish
(Continued)

FOREIGN PATENT DOCUMENTS

WO   2007/082562   7/2007
WO   2012/142471   10/2012
(Continued)

OTHER PUBLICATIONS

Pu, F. et al "Comments on Reshaping for HDR/WCG Compression" ISO/IEC JTC1/SC29/WG11 MPEG 2015/M37267, Oct. 2015, Geneva Switzerland, Chapters 1-2.
(Continued)

*Primary Examiner* — Marnie A Matt

(57) ABSTRACT

A tone-mapping function that maps input images of a high dynamic range into reference tone-mapped images of a relatively narrow dynamic range is generated. A luma forward reshaping function is derived, based on first bit depths and second bit depths, for forward reshaping luma codewords of the input images into forward reshaped luma codewords of forward reshaped images approximating the reference tone-mapped images. A chroma forward reshaping mapping is derived for predicting chroma codewords of the forward reshaped images. Backward reshaping metadata that is to be used by recipient devices to generate a luma
(Continued)

backward reshaping function and a chroma backward reshaping mapping is transmitted with the forward reshaped images to the recipient devices. Techniques for the joint derivation of forward luma and chroma reshaping functions are also presented.

16 Claims, 12 Drawing Sheets

(51) Int. Cl.
| | |
|---|---|
| G06T 5/00 | (2006.01) |
| H04N 19/80 | (2014.01) |
| H04N 19/154 | (2014.01) |
| H04N 19/117 | (2014.01) |
| H04N 19/102 | (2014.01) |
| H04N 19/187 | (2014.01) |
| H04N 19/44 | (2014.01) |
| H04N 1/60 | (2006.01) |
| H04N 19/85 | (2014.01) |
| H04N 1/64 | (2006.01) |

(52) U.S. Cl.
CPC ......... *H04N 19/102* (2014.11); *H04N 19/117* (2014.11); *H04N 19/154* (2014.11); *H04N 19/176* (2014.11); *H04N 19/187* (2014.11); *H04N 19/44* (2014.11); *H04N 19/80* (2014.11); *H04N 1/6027* (2013.01); *H04N 1/648* (2013.01); *H04N 19/85* (2014.11); *H04N 2201/3256* (2013.01)

(58) Field of Classification Search
CPC .... H04N 1/6058; H04N 19/44; H04N 19/187; H04N 19/102; H04N 19/85; H04N 2201/3256; H04N 1/648; H04N 1/6027; G06T 5/008
USPC .................................................... 375/240.06
See application file for complete search history.

(56) References Cited

U.S. PATENT DOCUMENTS

| | | | |
|---|---|---|---|
| 9,497,456 B2 | 11/2016 | Su | |
| 9,584,811 B2 | 2/2017 | Su | |
| 9,628,808 B2 | 4/2017 | Su | |
| 9,936,199 B2 | 4/2018 | Froehlich | |
| 10,080,026 B2 | 9/2018 | Su | |
| 2010/0157078 A1* | 6/2010 | Atanassov | G06T 5/007 |
| | | | 348/222.1 |
| 2012/0183063 A1* | 7/2012 | Liu | H04N 19/23 |
| | | | 375/240.13 |
| 2014/0037205 A1* | 2/2014 | Su | G06T 5/009 |
| | | | 382/166 |
| 2014/0105289 A1 | 4/2014 | Su | |
| 2014/0369409 A1* | 12/2014 | Su | H04N 19/119 |
| | | | 375/240.12 |
| 2017/0041626 A1* | 2/2017 | Efremov | H04N 19/136 |
| 2018/0041759 A1 | 2/2018 | Froehlich | |
| 2018/0115774 A1 | 4/2018 | Su | |
| 2019/0068969 A1* | 2/2019 | Rusanovskyy | H04N 19/124 |

FOREIGN PATENT DOCUMENTS

| | | |
|---|---|---|
| WO | 2014/025588 | 2/2014 |
| WO | 2016/140954 | 9/2016 |
| WO | 2017/003525 | 1/2017 |

OTHER PUBLICATIONS

ITU-R Recommendation ITU-R BT.1886 "Reference Electro-Optical Transfer Function for Flat Panel Displays Used in HDTV Studio Production" Mar. 2011, pp. 1-7.
SMPTE 2084:2014 "High Dynamic Range Electro-Optical Transfer Function of Mastering Reference Displays" Aug. 16, 2014.
Stessen J. et al "Chromaticity Based Color Signals for Wide Color Gamut and High Dynamic Range" ISO/IEC JTC1/SC29/WG11 MPEG2014/M35065, Oct. 2014, pp. 1-18.
ITU-R BT. 2100 "Image Parameter Values for High Dynamic Range Television for Use in Production and International Programme Exchange" ITU, Jul. 2016.

* cited by examiner determine a tone-mapping function that maps input images into reference tone-mapped images 402 derive, based on first bit depths and second bit depths, a luma forward reshaping function 404 derive a chroma forward reshaping mapping for predicting chroma codewords of forward reshaped images 406 generate backward reshaping metadata for generating a luma backward reshaping function and a chroma backward reshaping mapping 408 transmit the forward reshaped images with the backward reshaping metadata to recipient devices 410

FIG. 4A

ENCODING AND DECODING REVERSIBLE PRODUCTION-QUALITY SINGLE-LAYER VIDEO SIGNALS

CROSS-REFERENCE TO RELATED APPLICATIONS

This application claims priority from U.S. Patent Application Nos. 62/312,450 filed 23 Mar. 2016 and 62/427,532 filed 29 Nov. 2016, which are hereby incorporated by reference in their entirety.

TECHNOLOGY

The present invention relates generally to images. More particularly, an embodiment of the present invention relates to encoding and decoding reversible production-quality single-layer video signals.

BACKGROUND

As used herein, the term 'dynamic range' (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "*Reference electro-optical transfer function for flat panel displays used in HDTV studio production*," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "*High Dynamic Range EOTF of Mastering Reference Displays*," which is incorporated herein by reference in its entirety. As appreciated by the inventors here, improved techniques for encoding and decoding reversible production-quality single-layer video signals that can be used to support a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1A:
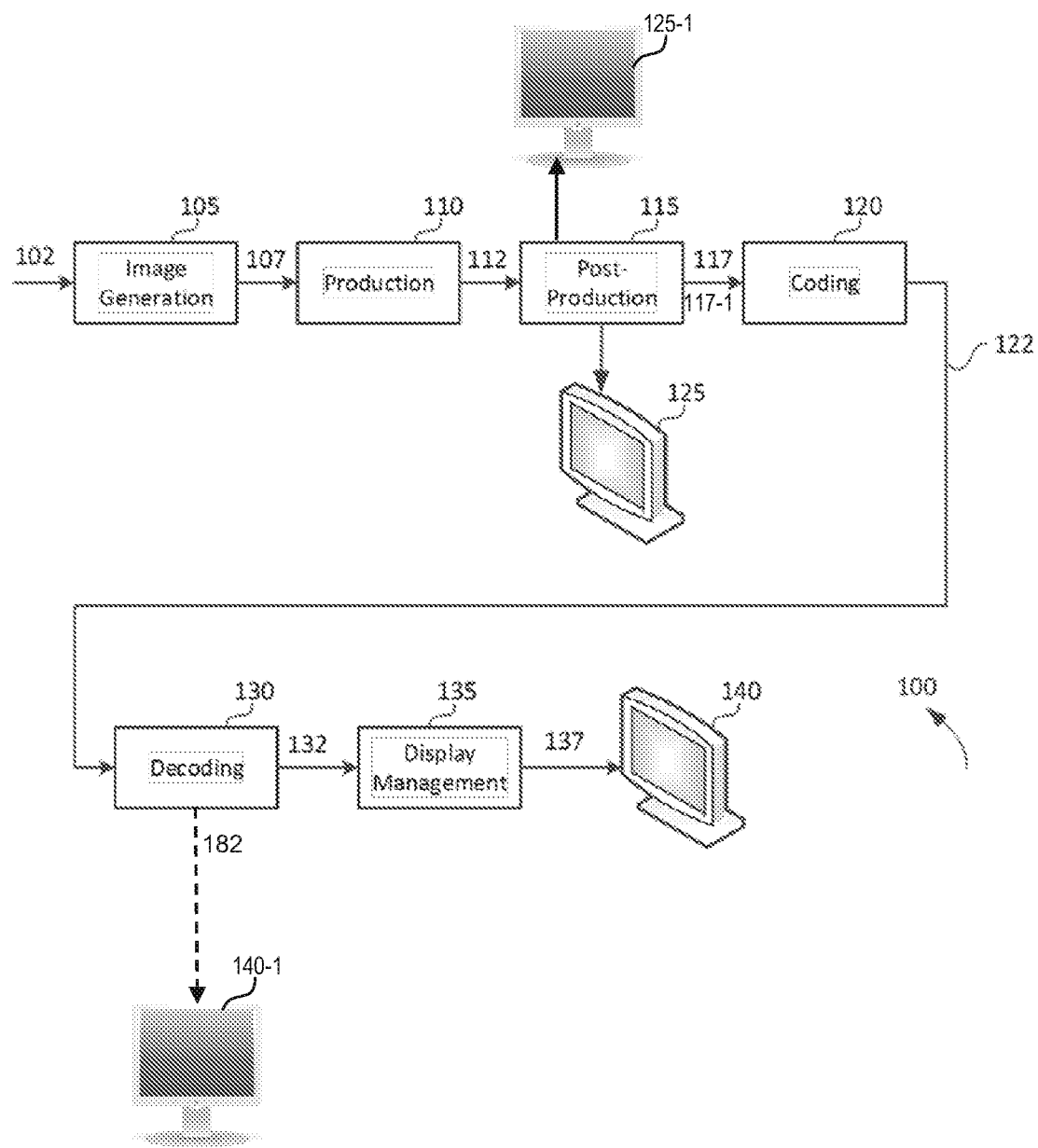
FIG. 1A depicts an example process for a video delivery pipeline.

Encoding and decoding reversible production-quality single-layer video signals are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to encoding reversible production-quality single-layer video signals. A tone-mapping function that maps one or more input images of a high dynamic range into one or more reference tone-mapped images of a relatively narrow dynamic range is determined. A luma forward reshaping function is derived, based on a plurality of first bit depths and a plurality of second bit depths, for forward reshaping luma codewords of the one or more input images into forward reshaped luma codewords of one or more forward reshaped images of the relatively narrow dynamic range. A chroma forward reshaping mapping is derived for predicting chroma codewords of the one or more forward reshaped images. The chroma forward reshaping mapping uses chroma codewords and the luma codewords of the one or more input images as input and uses the chroma codewords of the one or more reference tone-mapped images as a prediction target. The one or more forward reshaped images approximate the one or more reference tone-mapped images. More specifically, the forward reshaped luma codewords of the one or more forward reshaped images approximate luma codewords of the one or more reference tone-mapped images; the forward reshaped chroma codewords of the one or more forward reshaped images approximate chroma codewords of the one or more reference tone-mapped images. Backward reshaping metadata that is to be used by one or more recipient devices to generate a luma backward reshaping function and a chroma backward reshaping mapping is generated. The one or more forward reshaped images with the backward reshaping metadata are transmitted to the one or more recipient devices.

Example embodiments described herein relate to decoding reversible production-quality single-layer video signals. A luma backward reshaping function and a chroma backward reshaping mapping are constructed based on backward reshaping metadata received with one or more forward reshaped images of a relatively narrow dynamic range. The luma backward reshaping function is applied to forward reshaped luma codewords of the one or more forward reshaped images to generate backward reshaped luma codewords of one or more reconstructed images of a high dynamic range. The chroma backward reshaping mapping is applied to map forward reshaped chroma codewords and the forward reshaped luma codewords of the one or more forward reshaped images to backward reshaped chroma codewords of the one or more reconstructed images. The one or more reconstructed images approximate one or more input images of the high dynamic range. More specifically, the backward reshaped luma codewords of the one or more reconstructed images approximate luma codewords of the one or more input images; the backward reshaped chroma codewords of the one or more reconstructed images approximate chroma codewords of the one or more input images.

In another embodiment, forward luma and chroma reshaping functions are developed jointly. In a method, a processor receives a first input image in a first dynamic range (e.g., EDR) and a second input image in a second dynamic range (e.g., SDR), wherein the first image and the second image represent the same scene and the first dynamic range is higher than the second dynamic range. The processor generates a first luma reshaping function, mapping luminance pixels of the first image into luminance pixels of a third image with the second dynamic range, and a first chroma reshaping function, mapping chroma pixels of the first image into chroma pixels of the third image with the second dynamic range, wherein generating the first luma reshaping function and the first chroma reshaping function is based on pixel values of the first input image and the second input image. Next, the processor generates a first refined luma reshaping function, mapping luminance pixels of the first image into luminance pixels of a fourth image with the second dynamic range, wherein generating the first refined luma reshaping function is based on a first cost function and pixel values of the first image, the second image, and the third image, and a first refined chroma reshaping function, mapping chroma pixels of the first image into chroma pixels of the fourth image, wherein generating the first refined chroma reshaping function is based on a second cost function and pixel values of the first image, the second image, and the third image. The processor generates metadata related to the first refined luma reshaping function and the first refined chroma reshaping function. It also generates the fourth image based on the first refined luma reshaping function and the first refined chroma reshaping function. In an embodiment, this process may iterate until a global cost function meets a convergence criterion.

In another embodiment, a processor applies a fast method to generate a forward luma reshaping function. Given a first input image in a first dynamic range and a second input image in a second dynamic range, wherein the first image and the second image represent the same scene and the first dynamic range is higher than the second dynamic range, the processor divides the normalized range of luminance pixel values in the first input and the second input into bins and generates, for all bins, a 2-D histogram based on pixel values of the first input and the second input. For each bin in the luminance range of the first input: it computes a minimum and a maximum luminance value in the second dynamic range based on the 2-D histogram; it computes a cost for all luminance values within the minimum and the maximum luminance values, wherein the cost is based on a first weight and a second weight; it identifies an optimum luminance value for which the cost is minimum; and it generates a first mapping from luminance values in the first dynamic range to luminance values in the second dynamic range based on the optimum luminance value. The processor generates the forward luma reshaping function based on the first mapping. Next, it generates a third image in the second dynamic range based on the forward luma reshaping function and the first input image. Finally, the processor outputs the third image.

Example Video Delivery Processing Pipeline

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor for post-production editing (115). Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at post-production editing (115) to yield a high dynamic range version comprising input images (117) of a high dynamic range and a relatively narrow dynamic range version comprising reference tone-mapped images (117-1) of a relatively narrow dynamic range (e.g., SDR, etc.). The reference tone-mapped images may be a non-reversible tone-mapped version of the input images of the high dynamic range. During post-production editing (115), the input images of the high dynamic range are viewed on a first reference display (125) that supports the high dynamic range by a colorist who is performing post-production editing operations on the input images of the high dynamic range. During post-production editing (115), the reference tone-mapped images of the relatively narrow dynamic range are viewed on a second reference display (125-1) that supports the relatively narrow dynamic range by the same or a different colorist who is performing post-production editing operations on the reference tone-mapped images of the relatively narrow dynamic range.

Following post-production editing (115), the input images (117) of the high dynamic range and the reference tone-mapped images (117-1) of the relatively narrow dynamic range are delivered to coding block (120) for generating forward reshaped images (e.g., 182 of FIG. 1C) to be included in a code bit stream (122). The code bit stream (122) is to be delivered downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate the coded bit stream (122). In some embodiments, the coded bit stream (122) is encoded with a compressed version of the forward reshaped images (182 of FIG. 1C) generated from forward reshaping the input images (117) of the high dynamic range. In some embodiments, the forward reshaped images (182) encoded in the coded bit stream (122), as generated in the coding block (120) by approximating the reference tone-mapped images (117-1), preserve the artistic intent with which the reference tone-mapped images are generated in the post-production editing (115). Additionally, optionally, or alternatively, the coded bit stream (122) is further encoded with image metadata including but not limited to backward reshaping metadata that can be used by downstream decoders to perform backward reshaping on the forward reshaped images (182) in order to generate backward reshaped images (e.g., 132 of FIG. 1D) identical to or approximating the input images (117) of the high dynamic range images. The reference tone-mapped images may not be reversible in that the input images of the high dynamic range may not be reconstructed or predicted by inversely mapping the reference tone-mapped images. However, the forward reshaped images (182) are reversible in that the input images of the high dynamic range may be reconstructed or predicted by inversely mapping the forward reshaped images using backward reshaping.

In a receiver, the coded bit stream (122) is decoded by decoding block (130) to generate decoded images, which may be the same as the forward reshaped images (182) of the relatively narrow dynamic range (e.g., SDR, etc.) in some embodiments. In some embodiments, the receiver may be attached to a first target display (140-1). In scenarios in which the first target display (140-1) supports the relatively narrow dynamic range, the forward reshaped images (182) that approximate the reference tone-mapped images edited with the artistic content are directly watchable on a first target display (140-1), which may be of similar characteristics as the second reference display (125-1). In some embodiments, the receiver may be attached to a second target display (140), which may or may not have completely different characteristics than the first reference display (125). In that case, the decoding block (130) may perform backward reshaping on the forward reshaped images (182) into backward reshaped images (e.g., 132 of FIG. 1D) that represent an identical version or a close approximation of the input images (117) of high dynamic range. Additionally, optionally, or alternatively, a display management block (135)—which may be in the receiver, in the target display (140), or in a separate device—further adjusts the backward reshaped images (132) to the characteristics of the second target display (140) by generating display-mapped signal (137) adapted to the characteristics of the second target display (140).

Signal Quantization

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 cd/m$^2$ (or nits), within existing infrastructures and compression standards.

Techniques as described herein can be used to support any in a variety of PQ-based EOTFs, non-PQ-based EOTFs, color spaces, dynamic ranges, etc. The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An examples of PQ mapping function (or EOTF) is described in SMPTE ST 2084:2014, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 cd/m$^2$, one 12-bit code value corresponds to a relative change of approximately 0.0048 cd/m$^2$; however, at 1,000 cd/m$^2$, one 12-bit code value corresponds to a relative change of approximately 2.24 cd/m$^2$. This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065 (October 2014), which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames) of a video, there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Adaptive PQ" for short, denote methods to adaptively adjust the perceptual quantization of images based on their content.

Reshaped Signal Generation

Given a pair of corresponding high dynamic range and relatively narrow dynamic range images, that is, a pair of images that represent the same scene but at different levels of dynamic range, a multivariate multi-regression (MMR) predictor can be used to approximate one image of the pair in terms of the other image in the pair, or reshape one image of the pair into the other image in the pair, in some or all channels of codewords in the images.

Some examples of MMR-based prediction are described in U.S. Pat. No. 8,811,490, "Multiple color channel multiple regression predictor," which is hereby incorporated by reference as if fully set forth herein.

Figure 1B:
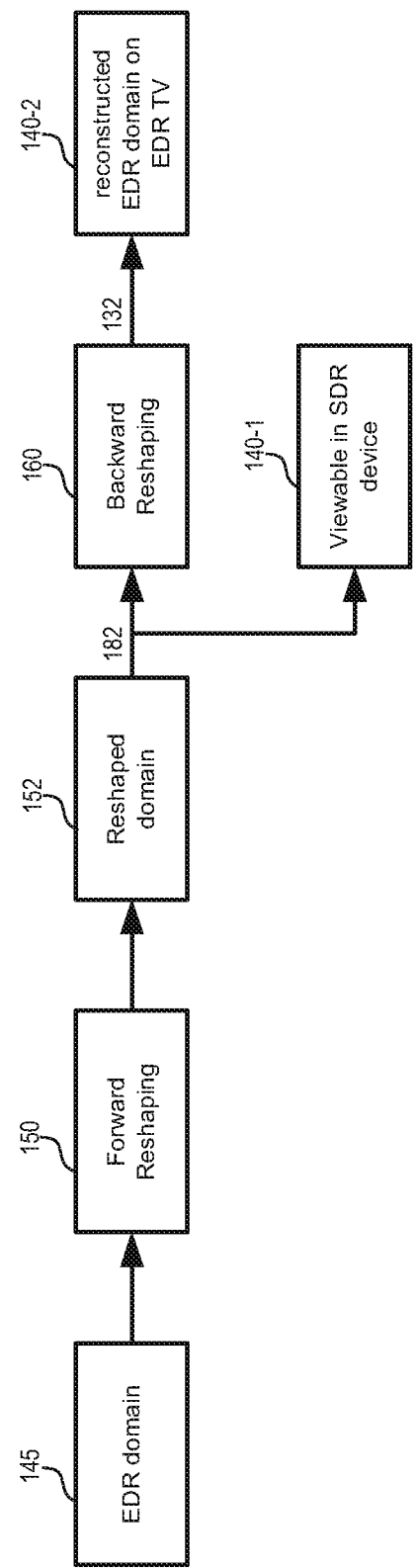
FIG. 1B depicts an example process for video data compression using content-adaptive quantization or reshaping.

FIG. 1B depicts an example process for using adaptive PQ and MMR reshaping to generate a watchable reshaped signal comprising (watchable) reshaped images of a relatively narrow dynamic range (e.g., Rec. 709, etc.) and to reconstruct based on the watchable reshaped signal and backward reshaping metadata therein images of a high dynamic range (e.g., Rec. 2020, EDR, IPTPQ (ICtCp), etc.).

As used herein, watchable reshaped images decoded from a coded bit stream refer to reshaped images that approximate the reference tone-mapped images (117-1) that are generated with first specific artistic intent; the first specific artistic intent may be embodied in post-production editing (115) in which a colorist edits the reference tone-mapped images (117-1) while the colorist views the reference tone-mapped images on a second reference display 125-1 that supports the relatively narrow dynamic range.

As used herein, backward reshaped images (e.g., 132 of FIG. 1D) reconstructed from watchable reshaped images and backward reshaping metadata decoded from a coded bit stream refer to reconstructed images that approximate the input images (117) that are generated with second artistic intent; the second specific artistic intent may be embodied in post-production editing (115) in which a colorist edits the input images (117) while the colorist views the input images (117) on a first reference display 125 that supports the high dynamic range.

By way of example but not limitation, the input images (117) after the post-production editing (115) may be represented in an EDR domain (e.g., 145, etc.) such as an IPTPQ (ICtCp) domain, a Rec. 2020 color space, Hybrid Log-Gamma (HLG) domain, etc. A forward reshaping block (150) analyzes the input images (117) in relation to the reference tone-mapped images (117-1) after the post-production editing (115). The forward reshaping block (150) generates codeword mapping functions (or forward reshaping functions) which map the input images (117) to re-quantized images (or the forward reshaped images 182 of FIG. 1C) of the relatively narrow dynamic range (e.g., Rec. 709, SDR, HLG, etc.) in a reshaped domain (152). In some embodiments, the forward reshaped images (182) represented in the reshaped domain (152) are forward reshaped from the input images (117) in such a manner that the forward reshaped images (182) relatively closely resemble the reference tone-mapped images (117) visually to viewers of the forward reshaped images (182) and the reference tone-mapped images.

In some embodiments, information (e.g., backward reshaping metadata, etc.) about the reshaping process may be generated and communicated in the coding block (120) to downstream devices (such as decoders) with the forward reshaped images (182) in the coded bit stream (122). The decoding block (130) decodes the coded bit stream (122) into the decoded images, which are the forward reshaped images (182) in the reshaped domain (152) previously encoded into the coded bit stream (122) in the coding block (120).

In some embodiments, the forward reshaped images (182) can be directly rendered on a display device (140-1) that supports the relatively narrow dynamic range—which may be the same as that of the forward reshaped images (182) in the reshaped domain (152)—of the decoded images.

In some embodiments, the forward reshaped images (182) may be processed by a backward reshaping block (160), which converts the forward reshaped images (182) encoded in the coding block (120), into a reconstructed version that comprises reconstructed images (132) identical to or approximating the input images (117) in the EDR domain (145).

In some embodiments, the reconstructed images (132) can be rendered on a display device (140-2) that supports the high dynamic range—which may be the same as that of the input images (117) in the EDR domain (145)—of the reconstructed images.

In some embodiments, the reconstructed images (132) can be further processed with device-specific display management operations (e.g., performed by the display management process (135) discussed earlier, etc.); the further processed reconstructed images may be rendered on a display device that may or may not support the same dynamic range of the reconstructed images. In some embodiments, the backward reshaping block (160) may be integrated with a de-quantizer in decoding block (130), e.g., as part of the de-quantizer in an AVC or HEVC video decoder.

Encoder-Side Architecture

Figure 1C:
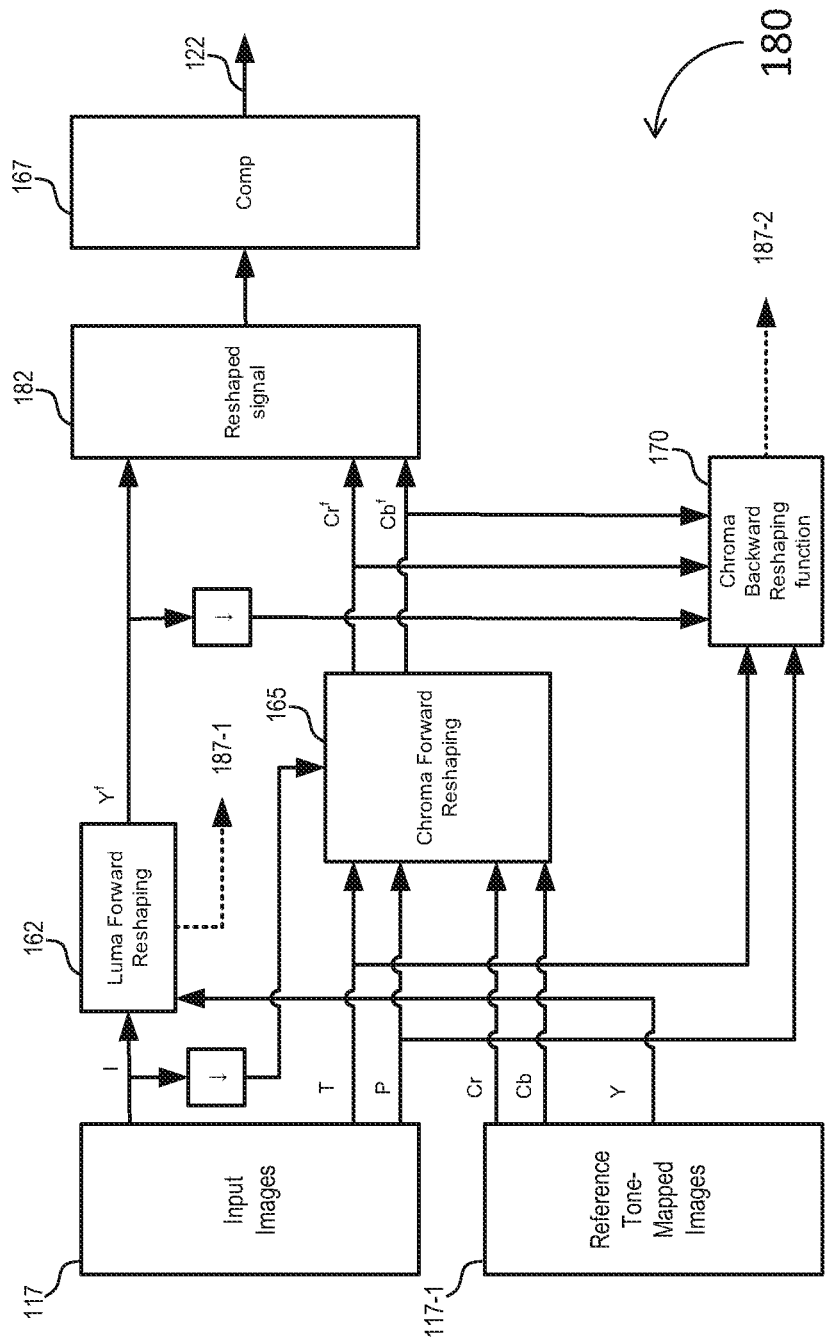
FIG. 1C and FIG. 1D depict example video encoder and decoder.

FIG. 1C illustrates example encoder-side codec architecture 180, which may be implemented with one or more computing processors in an upstream video encoder, etc.

The input images (117) of the high dynamic range after the post-production editing (115) may comprise, or may be further converted into, codewords in any of a variety of color spaces in any of a variety of sampling format. For the purpose of illustration only, the input images (117) are represented in the EDR domain (145) in an ICtCp color space in a 4:2:0 sampling format, and comprise luma codewords (denoted as "I" in a single luma channel) and chroma codewords (denoted as "P" and "T" in two chroma channels). It should be noted that ICtCp represents only one of many possible choices for an input format/domain in which the input images (117) may be represented. Examples of possible choices of input formats/domains may include, but are not necessarily limited to only, any of: YCbCr-PQ in Rec. 2020, DCI P3, or other color formats/domains The ICtCp color space and hybrid-log gamma (HLG) signal parameters are described in the ITU-R Rec. BT. 2100-0 (07/2016), "*Image parameter values for high dynamic range television for use in production and international programme exchange*," which is incorporated herein by reference in its entirety.

The reference tone-mapped images (117-1) of the relatively narrow dynamic range after the post-production editing (115) may comprise, or may be further converted into, codewords in any of a variety of color spaces in any of a variety of sampling format. For the purpose of illustration only, the reference tone-mapped images (117-1) are represented in the reshaped domain (152) in an YCbCr color space (e.g., Rec. 709, P3, Rec. 2020, gamma-based, HLG-based, PQ-based, etc.) in a 4:2:0 sampling format, and comprise luma codewords (denoted as "Y" in a single luma channel) and chroma codewords (denoted as "Cb" and "Cr" in two chroma channels). It should be noted that YCbCr represents only one of many possible choices for a format/domain in which the reference tone-mapped images (117-1) may be represented. Examples of possible choices of formats/domains may include, but are not necessarily limited to only, any of: Rec. 709, YCbCr gamma, Rec. 709 HLG, P3 HLG, or other color formats/domains.

Forward reshaping as performed by the forward reshaping block (150) in generating the forward reshaped images (182) plays a relatively important role in ensuring that the input images of the high dynamic range (e.g., EDR, etc.) are efficiently compressed into the forward reshaped images (182) of the relatively narrow dynamic range (e.g., Rec. 709, SDR, etc.) in the reshaped domain (152), while at the same time ensuring that the forward reshaped images (182) are of the (e.g., near) production-quality that is directly viewable on a display device of the relatively narrow dynamic range. That way, the first specific artistic intent embodied in creating the reference tone-mapped images (117-1) after the post-production editing (115) is preserved relatively intact in the forward reshaped images (182) of the relatively narrow dynamic range.

In the meantime, the forward reshaping as performed by the forward reshaping block (150) should be reversible or invertible, thereby allowing the forward reshaped images (182) to be backward reshaped (or to be reshaped back) into backward reshaped images (e.g., 132 of FIG. 1D) of the high dynamic range (e.g., in the EDR domain, in an IPTPQ (ICtCp), in an YCbCr-PQ domain, etc.). The backward reshaped images (132) represent the reconstructed images (132) that are identical to, or relatively closely approximate, the input images (117) in the EDR domain (145). That way, the second specific artistic intent embodied in creating the input images (117) after the post-production editing (115) is also preserved relatively intact in the reconstructed images (132) of the high dynamic range.

In some embodiments, the forward reshaping block (150) comprises a luma forward reshaping block (162) to forward reshape the luma codewords (I) of the input images (117) in the EDR domain (145) into forward reshaped luma codewords (denoted as "V") of the forward reshaped images (182) in the reshaped domain (152) that approximate tone-mapped luma codewords of the reference tone-mapped images (117-1). The luma forward reshaping block (162) may be specifically configured to avoid banding artifacts and to improve compression efficiency.

In some embodiments, a method used by the luma forward reshaping block (162) to reshape luma codewords may make use of a single-channel forward reshaping function generated based on combining CAQ (content-adaptive perceptual quantization) based codeword allocation algorithm with a tone-mapping codeword allocation algorithm.

Some examples of generating noise masks are described in PCT Application PCT/US2016/020230, filed on Mar. 1, 2016, entitled "Content-adaptive perceptual quantizer for high dynamic range images" by Jan Froehlich et al.; and PCT Application PCT/US2016/020232, filed on Mar. 1, 2016, entitled "*Real-time content-adaptive perceptual quantizer for high dynamic range images*" by G-M Su. The above-mentioned patent applications are hereby incorporated by reference as if fully set forth herein.

Since a color space and/or color gamut of a reference display (e.g., 125, etc.) used to edit the input images (117) of the high dynamic range in the post-production editing (115) is typically different from a color space and/or color gamut of another reference display (e.g., 125-1, etc.) used to edit the reference tone-mapped images (117-1) of the relatively narrow dynamic range in the post-production editing (115), the forward reshaping block (150) also needs to address the chroma reshaping issue.

In some embodiments, the forward reshaping block (150) comprises a chroma forward reshaping block (165) to forward reshape the chroma codewords (P and T). The chroma forward reshaping block (165) may implement a method to reshape chroma codeword (P and T) that is different from the (separate) single-channel method used by the luma forward reshaping block (162) to reshape luma codewords (I).

In some embodiments, the method used by the chroma forward reshaping block (165) to reshape chroma codewords may be based on a MMR-based algorithm that supports multiple-channel (or cross-channel) reshaping. The chroma forward reshaping block (165) receives the chroma codewords (P and T) of the input images (117), the chroma codewords (Cr and Cb) of the reference tone-mapped images (117-1), and downsampled luma codewords of the input images (117), as input. The input as received by the chroma forward reshaping block (165) may be mapped by the chroma forward reshaping block (165) into forward reshaped chroma codewords (denoted as "$Cr^{f\!s}$" and "$Cb^{f\!s}$") of the forward reshaped images (182) in the reshaped domain (152).

In some embodiments, the forward reshaping block (150) is configured to generate a (e.g., single-channel) luma backward reshaping function 187-1, as will be further explained in detail.

In some embodiments, the forward reshaping block (150) comprises a chroma backward reshaping mapping generator (170) to use the chroma codewords (P and T) of the input images (117), the forward reshaped chroma codewords ($Cr^f$ and $Cb^f$) of the forward-reshaped images (182), and downsampled forward reshaped luma codewords generated by downsampling the forward reshaped luma codewords ($Y^f$) of the forward-reshaped images (117), as input, to generate a chroma backward reshaping mapping 187-2, as will be further explained in detail.

Operational parameters defining/specifying the luma backward reshaping function (187-1) and the chroma backward reshaping mapping (187-2) may be included as backward mapping metadata in image metadata to be encoded with the forward reshaped images (182) by a compressor (167) into the coded bit stream (122).

Decoder-Side Architecture

Figure 1D:
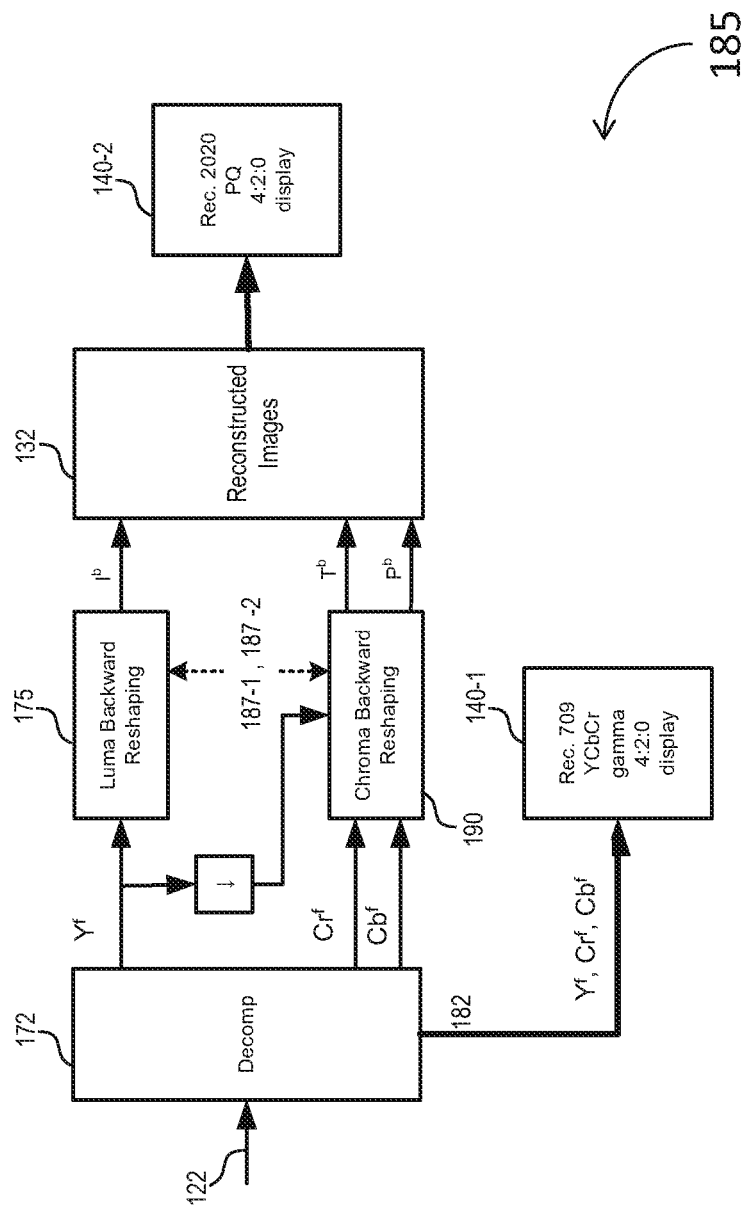

FIG. 1D illustrates example decoder-side codec architecture 185, which may be implemented with one or more computing processors in a downstream video decoder, etc.

The coded bit stream (122) may be decoded by a decompressor 172 into the decoded images, which may be the same as the forward reshaped images (182) and comprise the luma forward reshaped codewords ($Y^f$) and the chroma forward reshaped codeword ($Cr^f$ and $Cb^f$).

In some embodiments, the forward reshaped images (182) with little or no changes can be directly rendered on a display device such as the first target display (140-1) that supports the relatively narrow dynamic range. As the forward reshaped images (182) are generated to relatively closely approximate the reference tone-mapped images (117-1) after the post-production editing (115), the forward reshaped images (182) are expected to preserve to the specific artistic intent embodied in creating the reference tone-mapped images (117-1).

Additionally, optionally, or alternatively, the forward reshaped images (182) of the relatively narrow dynamic range, as decoded from the coded bit stream (122), may be further backward reshaped into the backward reshaped images (132) of the high dynamic range. For example, a luma backward reshaping block 175 may be configured to apply the luma backward reshaping function (187-1) as defined/specified in the backward reshaping metadata that is carried with the encoded forward reshaped images in the coded bit stream (122) to the luma forward reshaped codewords ($Y^f$) as input to generate luma backward reshaped codewords ($I^b$) of the backward reshaped images (132) as output.

Further, a chroma backward reshaping block 190 may be configured to apply the chroma backward reshaping mapping (187-2) as defined/specified in the backward reshaping metadata that is carried with the encoded forward reshaped images in the coded bit stream (122) to the chroma forward reshaped codewords ($Cr^f$ and $Cb^f$) and downsampled luma forward reshaped codewords generated by downsampling the luma forward reshaped codewords ($Y^f$) as input to generate chroma backward reshaped codewords ($T^b$ and $P^b$) of the backward reshaped images (132) as output. It should be noted that IPTPQ (ICtCp) represents only one of many possible choices for an output format/domain in which the reconstructed images (132) may be represented. Examples of possible choices of output formats/domains may include, but are not necessarily limited to only, any of: YCbCr-PQ in Rec. 2020, DCI P3, or other color formats/domains. It should also be noted that the reconstructed images (132) may be further transformed into an output format/domain that may or may not be the same as an input format/domain in which the input images (117) are represented.

In some embodiments, the backward reshaped images (132) with little or no changes can be directly rendered on a display device such as the display device (140-2) that supports the high dynamic range. As the backward reshaped images (132) are generated to be identical or relatively closely approximate the input images (117) after the post-production editing (115), the backward reshaped images (132) are expected to preserve to the specific artistic intent embodied in creating the input images (117).

Combining Adaptive PQ With Tone Mapping

Figure 2:
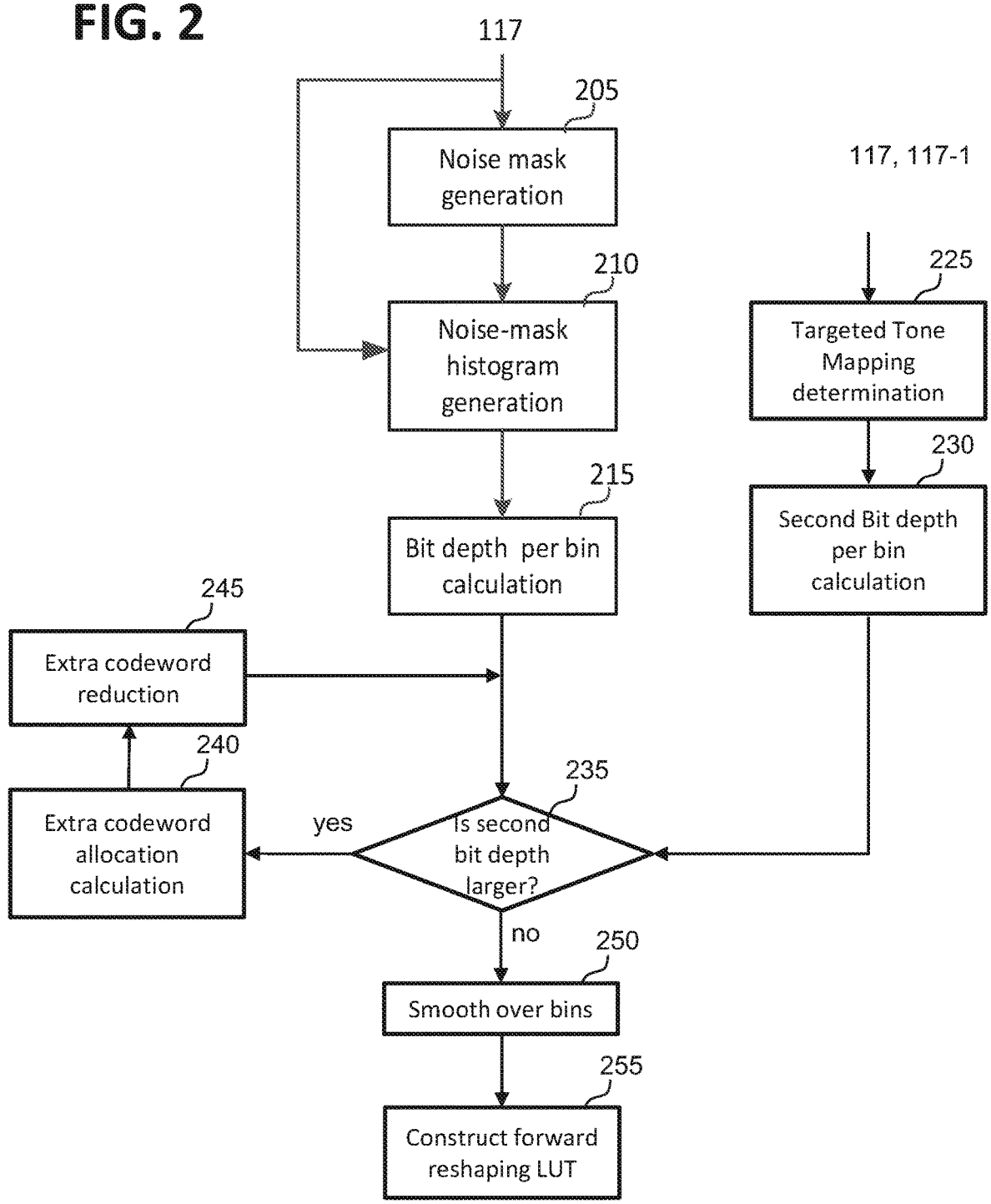
FIG. 2 depicts an example process for generating luma forward reshaping functions.

FIG. 2 depicts an example process for generating a single-channel luma forward reshaping function (e.g., used to forward reshape the luma codewords of the input images (117)) based on CAQ and tone mapping codeword allocations. Some or all of which may be performed by the forward reshaping block (150).

A first codeword allocation may be determined based on CAQ. As depicted in FIG. 2, given a sequence of input images (e.g., input video frames) (117), block (205) is used to generate a noise mask image which characterizes each pixel in one or more input images in the sequence of input images (117) in terms of the pixel's perceptual relevance in masking quantization noise. The noise mask image, in combination with the image data of the one or more input images, is used in step (210) to generate a noise mask histogram. Block (215) estimates a first bit depth (or the number of minimum bits required) for each bin of the histogram generated in step (210) based on the noise mask histogram.

A second codeword allocation may be determined based on tone mapping. As depicted in FIG. 2, given a sequence of reference tone-mapped images (e.g., tone-mapped video frames) (117-1) and the sequence of input images (117), block (225) determines a tone-mapping function that (e.g., approximately) converts/maps the one or more input images in the sequence of input images (117) to one or more corresponding reference tone-mapped images in the sequence of reference tone-mapped images (117-1). Block (230) calculates a second bit depth for each bin of the noise mask histogram based on the tone-mapping function.

The first bit depth may be considered as a minimum bit depth below which banding artifacts may possibly occur. Block (235) compares the second bit depth with the first bit depth for each bin.

If the second bit depth for any input codeword bin is lower than the first bit depth for the bin, block (240) calculates an amount of additional codewords (or a delta bit depth) needed to be allocated for the bin. Block (245) reduces the same amount of additional codewords (or the delta bit depth) to be allocated to the bin from second bit depths of other bins in which each of the second bit depths is larger than a corresponding first bit depth. A constraint may be implemented by techniques as described herein to ensure that a reduced second bit depth in each of the other bins is no less than the first bit depth for that other bin. Blocks (235), (240) and (245) may be repeated up to a ceiling number of iterations. The reduced bit depth for each of the other bins is set as the (new) second bit depth for the next cycle of iteration.

After bit depths for all bins are at least the first bit depths (or after the ceiling number of iterations is reached), block (250) smoothens all resultant bit depths over all the bins. Based on the smoothened bit depths, block (255) constructs the luma forward reshaping function, for example in the form of a forward lookup table (FLUT). The smoothening operation may be needed to ensure that a luma backward reshaping function corresponding to (e.g., an inverse of, etc.) the luma forward reshaping function can be approximated by a set of polynomial segments such as an 8-piece second order polynomial.

The luma forward reshaping function may then be used to forward reshape the luma codewords of the one or more input images into the forward reshaped luma codewords of the one or more corresponding forward reshaped images that approximate the one or more reference tone-mapped images.

Each of these steps is described in more detail next.

Noise Mask Generation

The basic idea of adaptive PQ is to allocate fewer bits in areas of the image that are noisy or have high texture, and more bits in areas of the image that are perceived as noise-free or smoother. Given an input image (117), the noise-mask generation block (205) generates an estimate of masking noise for each pixel in the image. In some embodiments, input (117) may be already coded using a gamma or PQ-based quantizer. In some other embodiments, input image (117) may be in linear space.

Let $I_{jp}$ denote the p-th pixel of a color component under quantization (e.g., luminance) in the j-th input image (or frame) in the sequence (117), normalized to (0 1). Let $v_{Lj}$ and $v_{Hj}$ denote the minimum and maximum pixel values in this image, or $$v_{Lj} = \min\{I_{jp}\},$$
$$v_{Hj} = \max\{I_{jp}\}. \quad (1)$$

In some embodiments, a first low-pass filter is applied to image $I_j$. In an embodiment, this filter mimics the characteristics of the human visual system. Depending on the available computational power, this filter may range from a very simple filter, like a Box filter or a Gaussian filter, to more complex filter banks, like those implementing the Cortex transform. In an embodiment, the first filter may be a two-dimensional Gaussian filter $G(r_L, \sigma_L^2)$ with support range $r_L$ and variance $\sigma_L^2$ (e.g., $r_L=9$ and $\sigma_L^2=3$ or $r_L=33$ and $\sigma_L^2=4$). Then, its output (L) may be expressed as $$L_{jp} = I_{jp} \otimes G(r_L, \sigma_L^2), \quad (2)$$

where the symbol ⊗ denotes a convolution. Given the output of the first filter, the high frequencies components of the input image may be extracted as $$\tilde{H}_{jp} = |I_{jp} - L_{jp}|. \quad (3)$$

These high frequencies components may then be filtered again by a second low-pass filter to generate the noise mask (H). This is to address the low-phase accuracy of HVS masking (that is, there is still masking at the zero crossings of a masking signal). In an embodiment, the second LPF may also be a Gaussian filer with support range $r_H$ and variance $\sigma_H^2$ (e.g., $r_H=9$, $\sigma_H^2=3$). Then, the noise mask (H) may be expressed as $$H_{jp} = \tilde{H}_{jp} \otimes G(r_H, \sigma_H^2). \quad (4)$$

In an embodiment, the parameters of the first and second low pass filters may be the same. In a preferred embodiment, the first and second low-pass filters are separable filters to improve computational efficiency. In an embodiment, an optional step may be used to identify $H_{jp}$ pixels that can be ignored in subsequent processing since they may bias the adaptive quantization process. For example, if the image includes a letterbox frame (that is, black pixels that may frame the original image so that it conforms to a particular frame size or aspect ratio), then values related to the letterbox pixels may be ignored. Values related to image boundaries or letterbox boundaries may also be ignored since the output of the low-pass filters assumes that data at these borders are padded with constant values, which will generate lower noise values. Let $\Omega_j$ denote the set of all valid pixels under considerations, then the final output noise mask (322) may be expressed as $$H_j(i), i \in \Omega_j. \quad (5)$$

Noise Mask Histogram Generation

Let $B_I$ denote the bit depth of the input image (117) (e.g., $B_I=16$) and let $K=2^{B_I}$. Then the dynamic range 0 to K−1 may be partitioned into M bins of equal pixel interval values W, that is W=K/M. In an embodiment, for the j-th image, a noise histogram $b_j(m)$, where m denotes the m-th histogram bin (m=0, 1, 2, ... M−1), may be generated as follows:

a) Identify all pixels in the original image ($I_{ji}$, $i \in \Omega_j$) which have pixel values in the range $$\left[\frac{m}{M}, \frac{m+1}{M}\right).$$

b) Among those pixels, select the minimal $H_j(i)$, since, as described earlier, the masking elevation is not a 2D map. Or, given $$\Psi_{j,m} = \left\{ i \,\bigg|\, \frac{m}{M} \le I_{ji} < \frac{m+1}{M} \right\}, \quad (6)$$
$$b_j(m) = \min\{H_j(i) \mid i \in \Psi_{j,m}\}.$$

Note that sometimes certain bins may be empty, since there might not be any image pixels within the bin's pixel range. The indices of these bins may be stored and their state will be addressed later.

Adaptive PQ values may be adjusted at the image/frame level or at the scene level. As used herein, the terms 'scene' or 'shot' for a video sequence may relate to a series of consecutive images (or frames) in the video signal sharing similar color and dynamic range characteristics. Because of the consecutive nature of video prediction in most video compression formats, it may be preferable to adjust the quantization parameters only at boundaries that match the typical boundaries of a video encoder, such as scene changes or a new group of pictures (GOP). Thus, given a scene with F images, and image-based noise-masking histograms $b_j(m)$, a scene-based noise-masking histogram b(m) may be derived as $$b_m = \min\{b_j(m) | j=0,1, \ldots, F-1\}. \quad (7)$$

In an embodiment, assuming a noise upper bound of 1, noise bins for which there are no pixel values for the entire scene may be assigned the maximum possible noise level value, 1. In some embodiments, missing bins may also be interpolated from neighboring bins. For j=0, 1, 2, ..., F−1, scene-based minimum and maximum pixel values may also be generated as $$v_L = \min\{v_{Lj}\},$$
$$v_H = \max\{v_{Hj}\}. \quad (8)$$

Bit Depth Per Histogram-Bin Calculation

Given the noise level $b_m$ for each bin in the noise-mask histogram, the next step would be to determine the number of bits that need to be allocated for each input codeword bin. In an embodiment, such a mapping may be determined based on experimental user study results. For example, in one such study, users were shown to evaluate test images quantized to different bit depths, where Gaussian noise was added to the images before the quantization. Image regions with higher levels of mask noise can achieve full visual transparency at smaller bit depths. Alternatively, the smoother the image, the more bit depth is needed for an accurate and perceptually lossless representation.

Consider a set of data pairs $(\tilde{N}_i, \tilde{Q}_i)$, $i=1, 2, 3, \ldots, N$, where for the i-th input noise level $\tilde{N}_i$ it has been determined (e.g., via user studies or other techniques) that the corresponding minimal bit depth is $\tilde{Q}_i$. In an embodiment, these pairs can be expressed as a masking-noise to(bit depth function $$Q_m = f_N(b_m). \tag{9}$$

For example, without limitation, using simple linear interpolation, for $\tilde{N}_n \leq b_m \leq \tilde{N}_{n+1}$, $$Q_m = \tilde{Q}_n - (\tilde{Q}_n - \tilde{Q}_{n+1})\frac{b_m - \tilde{N}_n}{\tilde{N}_{n+1} - \tilde{N}_n}. \tag{10}$$

In an embodiment, the $Q_m = f_N(b_m)$ mapping may be computed using a look-up table. In an embodiment, it may be more convenient to perform codeword mapping (220) based on the number of required codewords within a histogram bin instead of using the bit depth data directly. This is examined in the next section.

Codeword Mapping Generation

Let $B_T$ denote the target bit depth for the re-quantized signal (152) (e.g., $B_T=10$ bits/pixel per color component), then the output will be mapped using $2^{B_T}$ codewords. In an embodiment, the range of codewords is normalized to one, hence let $$D_m = \left(\frac{2^{Q_m}}{2^{B_T}}\right) / 2^{B_I}. \tag{11}$$

denote the number of normalized codewords per bin m. For example, if $Q_m=9$, $B_I=16$ and $B_T=10$, then $D_m=2^{-17}$.

Let $$d_i = D_m \text{ for } (m-1)W \leq i < mW, \tag{12}$$

denote the number of normalized codewords per input $i \in (0, 2^{B_I}-1)$, then $d_i$ can be considered a CAQ-based lower bound for the number of required codewords per input codeword. The total number of normalized codewords for all input codewords, D, is bounded by 1, or $$D = \sum_{i=v_L}^{v_H} d_i \leq 1. \tag{13}$$

In some embodiments, the total number of normalized codeword, D, is no larger than 1. Any unused codewords (when D is less than 1) can be used for extra codeword allocation in generating a forward reshaping curve/function (e.g., the single-channel luma forward reshaping function, etc.) that reshapes input codewords (e.g., luma codewords, etc.) in an input image of the relatively high dynamic range down to reshaped codewords (e.g., reshaped luma codewords, etc.) of a corresponding forward reshaped image of the relatively narrow dynamic range.

Targeted Tone Mapping Function

Techniques as described herein can be used to support any in a variety of tone-mapping methods used (e.g., under the control of a colorist, in the post-production editing (115), etc.) in creating the reference tone-mapped images (117-1).

In some embodiments, a tone mapping function (denote as T(.)) may be determined or established in block (225) for the purpose of (e.g., approximately) representing a mapping from one or more input images in the input images (117) of the high dynamic range to one or more reference tone-mapped images in the reference tone-mapped images (117-1) of the relatively narrow dynamic range. Input values of the tone mapping function T(.) may range over all possible input codewords (e.g., luma codewords) in the one or more input images within the high dynamic range. Output values of the tone mapping function T(.) may be the same as, or may substantially approximate, tone-mapped codewords of the one or more reference tone-mapped images within the relatively narrow dynamic range maps (e.g., SDR, Rec. 709, etc.). In some embodiments, the output values can be normalized to (0 1). Given $v_L$ and $v_H$ (e.g., as determined in expression (8)), extreme values in the tone-mapped values may be given as follows:

$$c_L = T(v_L)$$

$$c_H = T(v_H) \tag{14}$$

The input codewords within $[v_L, v_H]$ are mapped to the tone-mapped codewords within $[c_L, c_H]$. Thus, the (unnormalized) range for the tone-mapped codewords may be represented as $c_H - c_L + 1$.

Given the bit depth of the target signal (a target output container signal) as $B_T$, the normalized range for the tone-mapped codewords may be given as follows:

$$T = \frac{c_H - c_L + 1}{2^{B_T}} \tag{15}$$

This represents a codeword budget for forward reshaping the one or more input images into one or more forward reshaped images that approximate the one or more reference tone-mapped images.

Targeted Bit Depth Per Bin

In some embodiments, block (230) determines a target bit depth (or a required bit depth) (denoted as $t_i$) for each input codeword (e.g., an i-th input codeword), as a differential value, as follows:

$$t_i = T(i) - T(i-1) \tag{16}$$

where T(i) is a tone-mapped word mapped from the i-th input codeword bin by the tone-mapped function T(.), and T(i-1) is an adjacent tone-mapped word mapped from an adjacent input codeword input (e.g., an (i-1)-th input codeword bin) next to the i-th input codeword bin by the tone-mapped function T(.). Additionally, optionally, or alternatively, in some embodiments, T(i) is a tone-mapped word mapped from the i-th input codeword by the tone-mapped function T(.), and T(i-1) is an adjacent tone-mapped word mapped from an adjacent input codeword (e.g., an (i-1)-th input codeword) next to the i-th input codeword by the tone-mapped function T(.).

The initial value $t_0$ for target bit depths may be set to 0. Note that the sum of all the target bit depths equals to T, as follows:

$$T = \sum_{i=v_L}^{v_H} t_i \le 1 \qquad (17)$$

Select Largest Value Per Bin

For each input codeword bin (e.g., an i-th input codeword), two different bit depths are determined. The first bit depth is $d_i$ from noise measurement, as determined in expression (12). The second bit depth is $t_i$ from tone mapping function, as determined in expression (16). Two sets of bit depths may be constructed in block (235), depending on which of the two bit depths has a larger value, as follows:

$$\Omega = \{i | t_i > d_i\}$$

$$\Phi = \{i | t_i \le d_i\} \qquad (18)$$

For each input codeword i, block (235) determines whether the tone mapping bit depth $t_i$ (or the second bit depth) is no larger than the bit depth $d_i$ (or the first bit depth). If the tone mapping bit depth $t_i$ is no larger than the $d_i$ ($i \in \Phi$), then the one or more reference tone-mapped images may be susceptible to have observable banding artifacts when luma codewords at or near the i-th input codeword are mapped to tone-mapped codewords or reshaped codewords in the relatively narrow dynamic range.

Therefore, in order to prevent possible banding artifacts, bit depth $d_i$ for input codewords in the set $\Phi$ may be used (for the purpose of determining the luma forward reshaping function), as follows:

$$\tilde{d}_i = d_i \text{ for } i \in \Phi \qquad (19)$$

Calculate Extra Allocated Codeword

The selection of bit depth $d_i$ for input codeword bins in the set $\Phi$ causes an extra allocation of codewords in the relatively narrow dynamic range to these input codeword bins as compared with other input codeword bins not in the set $\Phi$. This extra allocation of codewords can be calculated in block (240) as follows:

$$E = \sum_{i \in \Phi} (d_i - t_i) \qquad (20)$$

Deduct Extra Allocated Codeword

The extra amount of codewords E as determined in expression (20) may be deducted in block (245) from bit depths for input codeword bins that belong to the set $\Omega$. In some embodiments, a fixed number of codewords or a fixed amount of delta bit depth, such as $E/|\Omega|$ is equally deducted from each of the bit depths for the input codeword bins in the set, as follows:

$$\tilde{d}_i = t_i - E/|\Omega| \text{ for } i \in \Omega \qquad (21)$$

Check Lower Bound Violation

It is possible that $\tilde{d}_i < d_i$ for some input codeword bins in the set $\Omega$ after the extra codeword deduction in expression (21). If this happens, the process flow of FIG. 2 goes back to block (235) and re-computes the sets $\Phi$ and $\Omega$. Blocks (235) through (245) may be iteratively performed, until all bit depths for all input codeword bins in the high dynamic range have been allocated no less than bit depths computed from the noise mask histogram, or alternatively until a ceiling number of iterations has been reached.

Smoothen Bit Depths

The remaining processing steps may operate directly on the $\tilde{d}_i$ data. Bit depths $\tilde{d}_i$, as determined based on combining CAQ-based codeword allocation with tone mapping based codeword allocation, after satisfying minimum bit depth lower bound represented by bit depths computed from the noise mask histogram (e.g., the set $\Phi$ is empty), may be smoothened by a low pass filter, e.g., a 2N+1-tap averaging filter, for improved performance.

Let $$\tilde{s}_i = 0, \text{ for } i < V_L \text{ and } i > V_H$$

and $$\tilde{s}_i = \frac{1}{2N+1} \sum_{k=-N}^{N} a_k \tilde{d}_{i+k}, \text{ otherwise} \qquad (22)$$

where $a_k$, $k=-N, -N+1, \ldots, N$, denote the filter coefficients of the smoothing filter $$\left( \text{e.g., } a_k = \frac{1}{2N+1} \right).$$

In an embodiment, the length of this filter is large enough to span at least the size of two consecutive input codeword bins. Larger filters will provide better smoothing, but require more computational power.

Construct Forward Reshaping LUT

A forward look-up table (LUT) (denoted as FLUT) can be built based on the smoothened bit depths via cumulative summation with the minimum value $C_L$ in the tone-mapped values of the relatively narrow dynamic range as an offset $$c_i^Y = FLUT(v_i^Y) = c_L + \sum_{k=0}^{v_i^Y} \tilde{s}_k \qquad (23)$$

FLUT can be used to forward reshape luma codewords of the one or more input images of the high dynamic range into one or more forward reshaped images of the relatively narrow dynamic range.

Figure 3:
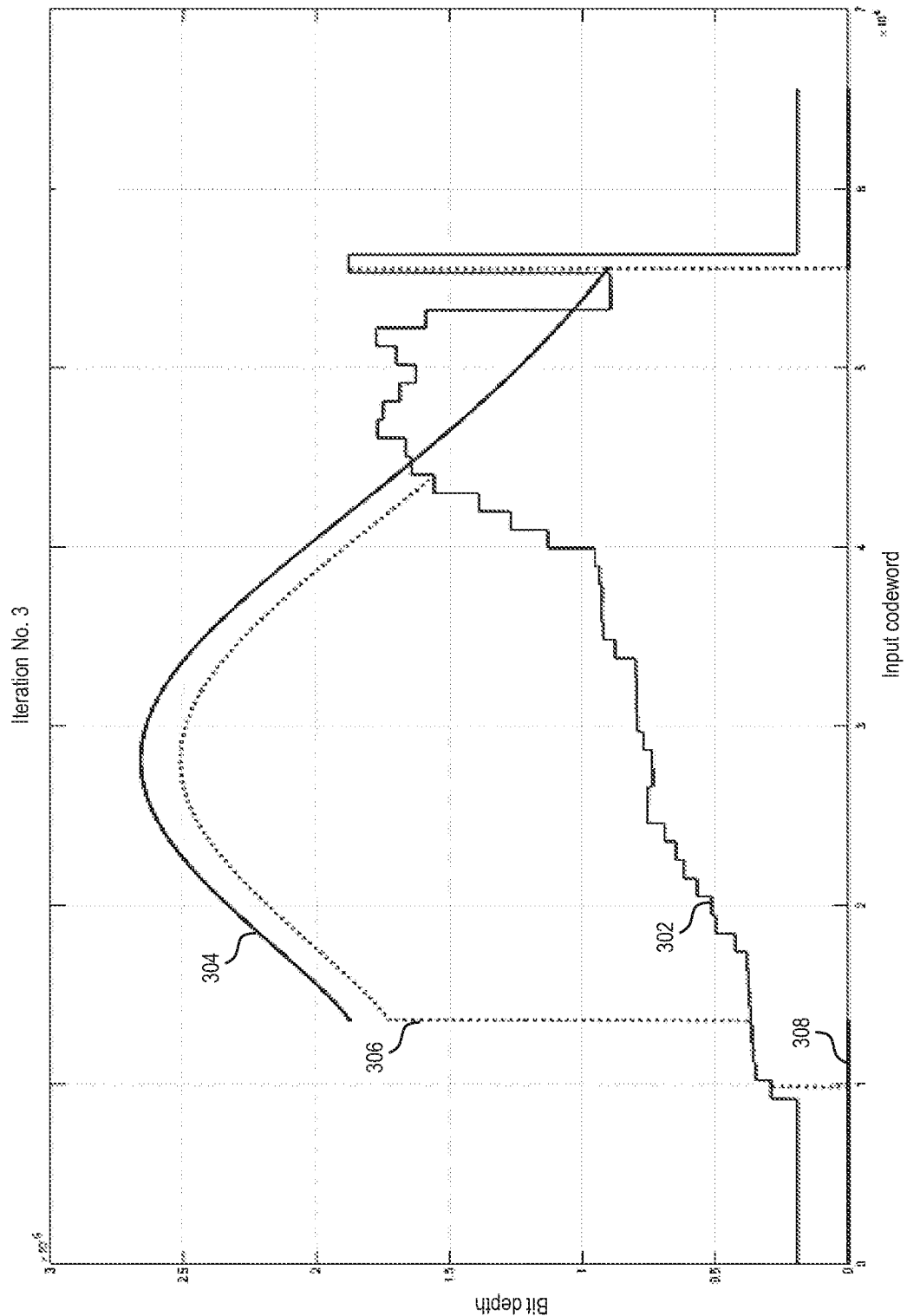
FIG. 3 illustrates an example luma forward reshaping function.

FIG. 3 depicts an example luma forward reshaping function (e.g., derived after three iterations/rounds of extra codeword deduction/allocation). A first plot 302 represents a plurality of first bit depths over input codewords (or input codeword bins) computed based on noise measurements of the input images of the high dynamic range. A second plot 304 represents a plurality second bit depths over the same input codewords (or the same input codeword bins) computed based on a tone-mapping function that approximates or represents a mapping of the input images to the reference tone-mapped images. A third plot 306 represents the luma forward reshaping function that can be used to forward reshape the input images into the reshaped images (e.g., 182 of FIG. 1C) that are reversible production-quality single-layer images that approximate the reference tone-mapped images. As illustrated, in a range of input codewords between 4,500 and 5,600 (pre-normalized values), the first bin depths are greater than the second bin depths, which indicates a possibility for banding artifacts in the forward reshaped images if insufficient codewords of the relatively narrow dynamic range are allocated to map input codewords in the range. The luma forward reshaping function as represented by the third plot (306) uses the first bit depths in that range to reduce or prevent the banding artifacts. The elevation of the second bit depths to the first bit depths in the range may be compensated by reducing extra codeword allocations in other ranges such as a range of input codewords between 1,300 and 4,500 (pre-normalized values) where the first bit depths are smaller than the second bit depths. In some embodiments, clipping operations may have been performed in generating the reference tone-mapped images. For example, input codewords in a clipped range 308 between 0 and 1,300 (pre-normalized values) in the input images are set to zero (or clipped to zero) in the reference tone-mapped images. Under techniques as described herein, the luma forward reshaping function still represents the input codewords in the clipped range (308) and uses the first bit depths in the clipped range (308) to ensure that there is no or little clipping in the forward reshaped images. As a result, the forward reshaped images generated in part with the luma forward reshaping function is reversible, preserves image data in the clipped range (308) of the reference tone-mapped images, and therefore can be used in backward reshaping operations to reconstruct or recover images of the high dynamic range that approximate the input images of the high dynamic range.

Luma Backward Reshaping Function

In some embodiments, backward reshaping (160) may be applied to reverse the effects of forward reshaping (150). In an embodiment, a luma backward reshaping function in the form of a look-up table for inverse quantization may be constructed as follows: a) For each codeword in the quantized domain ($s_c$), identify all input codewords ($V_i$) for which $FLUT(V_i)=s_c$. Let this group be denoted as $\omega(s_c)=\{V_i|FLUT(V_i)=s_c\}$; then b) Construct the backward reshaping function ($BLUT(s_c)$) as a function of $\omega(s_c)$. For example, in an embodiment, without limitation, $BLUT(s_c)$ may be constructed as the average of all codewords that belong to $\omega(s_c)$, or if $|\omega(s_c)|>0$ then $$BLUT(s_c) = \frac{\sum_{i \in \omega(s_c)} v_i}{|\omega(s_c)|} \quad (24)$$

where $|\omega(s_c)|$ denotes the number of elements in the set $\omega(s_c)$. If $|\omega(s_c)|=0$ for any $s_c$ values, in an embodiment, these values may be interpolated from its neighbor non-zero values.

In some embodiments, after the backward reshaping function, BLUT, is constructed, a set of polynomial segments such as an 8-piece $2^{nd}$ order polynomial, etc., may be used to approximate the BLUT. Some examples of using polynomial segments to approximate reshaping functions are described in PCT Application PCT/US2016/22772, filed on 17 Mar. 2016, "Signal reshaping approximation," the contents of which are hereby incorporated by reference as if fully set forth herein.

Forward Chroma Reshaping

As previously discussed in connection with luma forward reshaping, the luma codewords of the reference tone-mapped images (117-1) can be used as a target reference for luma forward reshaped codewords of the forward reshaped images in the reshaped domain (152) to approximate. Likewise, the chroma codewords of the reference tone-mapped images (117-1) can be used as a target reference for chroma forward reshaped codewords of the forward reshaped images in the reshaped domain (152) to approximate.

An upstream device may, but is not necessarily limited to only, an MMR-based forward reshaping prediction model to predict the chroma codewords (or codewords in the chroma channels) of the reference tone-mapped images using the codewords in all channels (e.g., I, P, and T channels, etc.) of the input images (117) in the EDR domain (145).

In some embodiments, codewords in each of the channels (e.g., I, P, T, Y, Cb, and Cr channels, etc.) in each of the reference tone-mapped images (117-1) and the input images (117) are normalized to a range of (0 1).

To perform the prediction under the MMR-based forward reshaping prediction model, the upstream device may first downsample the luma codewords (or codewords in I channel) of the input images (117) to the same sample size as the chroma codewords (or codewords in P or T channel) of the input images (117). For example, if the input images are in the 4:2:0 sampling format, the luma codewords can be downsampled by a factor of one half in each spatial dimension of a video image/frame.

Denote the (normalized) codewords (e.g., the luma codewords as downsampled, the chroma codewords, etc.) of the input images (117) in I/P/T channels in the EDR domain (145) as follows:

$$u_p = \begin{bmatrix} v_p^I \\ v_p^P \\ v_p^T \end{bmatrix} \quad (25)$$

An MMR polynomial/vector (denoted as $\bar{u}_p$) may be constructed based on as $u_p$, as described in previously mentioned U.S. Pat. No. 8,811,490.

Denote the chroma codewords of the reference tone-mapped images (117-1) in the Cb and Cr chroma channels (e.g., SDR channels, etc.) as follows:

$$\bar{s}_p = \begin{bmatrix} s_p^{Cb} \\ s_p^{Cr} \end{bmatrix} \quad (26)$$

As mentioned, these chroma codewords can be used in the MMR-based forward reshaping prediction model as a target reference to be predicted from the codewords of the input images (117) in I/P/T channels in the EDR domain (145). Denote the predicted chroma values (in the reshaped domain (152)) to be predicted in the MMR-based forward reshaping prediction model as follows:

$$\tilde{c}_p = \begin{bmatrix} c_p^{Cb} \\ c_p^{Cr} \end{bmatrix} \quad (27)$$

The goal under the MMR-based forward reshaping prediction model is to determine or drive a forward reshaping MMR matrix (or function) $M_F$ such that the predicted chroma values $\tilde{c}_p$ are closest to the target reference as represented by the chroma codewords $s_p$ by minimizing a cost function.

In some embodiments, for an image/frame with a P number of chroma pixel values in each of the chroma channels, all the P number of pixel values in each of an input image and a reference tone-mapped image that corresponds to the input image may be placed in a single matrix, as follows:

$$\overline{U} = \begin{bmatrix} \overline{u}_0^T \\ \overline{u}_1^T \\ \vdots \\ \overline{u}_{P-1}^T \end{bmatrix} \quad (28)$$

$$\overline{S} = \begin{bmatrix} \overline{s}_0^T \\ \overline{s}_1^T \\ \vdots \\ \overline{s}_{P-1}^T \end{bmatrix}$$

Similarly, all the P number of pixel values in a forward reshaped image that approximate the reference tone-mapped image and that are to be predicted under the MMR-based forward reshaping prediction model may be placed in a single matrix, as follows:

$$\tilde{C} = \begin{bmatrix} \tilde{c}_0^T \\ \tilde{c}_1^T \\ \vdots \\ \tilde{c}_{P-1}^T \end{bmatrix} = \overline{U} M_F \quad (29)$$

The goal is then to find optimal values for the forward reshaping MMR matrix $M_F$ such that the following difference between $\tilde{C}$ and $\overline{S}$ is minimized:

$$\arg\min_{M_F} \|\overline{S} - \tilde{C}\|^2 = \arg\min_{M_F} \|\overline{S} - \overline{U} M_F\|^2 \quad (30)$$

In some embodiments, the optimal values for the forward reshaping MMR matrix $M_F$ can be obtained via the least squared solution, as follows:

$$M_F = (\overline{U}^T \overline{U})^{-1} (\overline{U}^T \overline{S}) \quad (31)$$

Backward Chroma Reshaping

To derive a backward reshaping MMR matrix (or function) for chroma channels under an MMR-based backward reshaping prediction model, a similar method, but with a different target reference and a different input, may be used.

Note that the chroma codewords in the input images (117) represent/constitute a chroma signal of the high dynamic range (e.g., in the EDR domain, etc.) on the decoder side. In other words, the forward reshaped codewords (in the luma and chroma channels Y, Cb, Cr), as obtained on the encoder side with the luma forward reshaping function for the luma channel and the forward reshaping MMR matrix for the chroma channels, can be used as the input in the MMR-based backward reshaping prediction model, whereas the (original) chroma codewords (in P and T channels) of the input images (117) can be used as the target reference.

To perform the prediction under the MMR-based backward reshaping prediction model, the downstream device may first downsample the forward reshaped luma codewords (or codewords in Y channel) of the forward reshaped images to the same sample size as the chroma codewords (or codewords in Cb or Cr channel) of the forward reshaped images. For example, if the forward reshaped images are in the 4:2:0 sampling format, the luma codewords can be downsampled by a factor of one half in each spatial dimension of a video image/frame.

Denote the (normalized) codewords (e.g., the luma codewords as downsampled, the chroma codewords, etc.) of the forward reshaped images in Y/Cb/Cr channels as follows:

$$h_p = \begin{bmatrix} c_p^Y \\ c_p^{Cb} \\ c_p^{Cr} \end{bmatrix} \quad (32)$$

An MMR polynomial/vector (denoted as $\overline{h}_p$) can be constructed based on $h_p$ as described in previously mentioned U.S. Pat. No. 8,811,490. The goal for the MMR-based backward reshaping prediction model is to reconstruct (or get back to at least approximately) the (original) chroma codewords of the input images (117) in the chroma channels (P and T channel).

Denote the chroma codewords of the input images (117) in the P and T chroma channels (e.g., EDR channels, etc.) as follows:

$$\overline{q}_p = \begin{bmatrix} v_p^P \\ v_p^T \end{bmatrix} \quad (33)$$

As mentioned, these chroma codewords can be used in the MMR-based backward reshaping prediction model as a target reference to be predicted from the codewords of the forward reshaped images in Y/Cb/Cr channels in the reshaped domain (152). Denote the predicted chroma values (in the EDR domain (145)) to be predicted in the MMR-based backward reshaping prediction model as follows:

$$\hat{v}_p = \begin{bmatrix} \hat{v}_p^P \\ \hat{v}_p^T \end{bmatrix} \quad (34)$$

The goal under the MMR-based backward reshaping prediction model is to determine or drive a backward reshaping MMR matrix (denoted as $M_B$) such that the predicted chroma values $\hat{v}_p$ are closest to the target reference as represented by the chroma codewords $v_p$ by minimizing a cost function.

In some embodiments, for an image/frame with a P number of chroma pixel values in each of the chroma channels, all the P number of pixel values in each of a forward reshaped image and a reconstructed image that approximates a corresponding input image may be placed in a single matrix, as follows:

$$\overline{H} = \begin{bmatrix} \overline{h}_0^T \\ \overline{h}_1^T \\ \vdots \\ \overline{h}_{P-1}^T \end{bmatrix} \quad (35)$$

$$\overline{Q} = \begin{bmatrix} \overline{q}_0^T \\ \overline{q}_1^T \\ \vdots \\ \overline{q}_{P-1}^T \end{bmatrix}$$

Similarly, all the P number of pixel values in the reconstructed image that approximate the input image and that are to be predicted under the MMR-based backward reshaping prediction model may be placed in a single matrix, as follows:

$$\hat{V} = \begin{bmatrix} \hat{v}_0^T \\ \hat{v}_1^T \\ \vdots \\ \hat{v}_{P-1}^T \end{bmatrix} = \overline{H} M_B \quad (36)$$

The goal is then to find optimal values for the backward reshaping MMR matrix $M_B$ such that the following difference between $\hat{V}$ and $\overline{Q}$ is minimized:

$$\arg\min_{M_F} \|\overline{Q} - \hat{V}\|^2 = \arg\min_{M_F} \|\overline{Q} - \overline{H}M_B\|^2 \quad (37)$$

In some embodiments, the optimal values for the backward reshaping MMR matrix $M_B$ can be obtained via the least squared solution, as follows:

$$M_B = (\overline{H}^T\overline{H})^{-1}(\overline{H}^T\overline{Q}) \quad (38)$$

Steerable Saturation Adjustment

Since the MMR-based forward reshaping prediction model is used to generate/predict forward reshaped images that approximate reference tone-mapped images (e.g., 117-1), the forward reshaped images as predicted may not be identical to the reference tone-mapped images. In other words, there is a distortion gap between the reference tone-mapped images (117-1) and the forward reshaped images.

In some embodiments, to increase saturation in the forward reshaped images, the reference tone-mapped images may be slightly adjusted, such as to increase saturation in the reference tone-mapped images. Optimization/prediction under the MMR-based forward reshaping prediction model may be performed after the saturation in the reference tone-mapped images has been increased. As a result, the forward reshaped images can also have more saturated colors than otherwise.

To do so, a scaling factor $(w^{Cb}, w^{Cr})$ may be used to control desired saturation by a colorist in the reference tone-mapped images (e.g., during the post-production editing (115), etc.), as follows:

$$\overline{s}_p(w^{Cb}, w^{Cr}) = \begin{bmatrix} w^{Cb}(s_p^{Cb} - 0.5) + 0.5 \\ w^{Cr}(s_p^{Cr} - 0.5) + 0.5 \end{bmatrix} \quad (39)$$

For an image/frame with a P number of chroma pixel values in each of the chroma channels, all the P number of pixel values in a reference tone-mapped image may be placed in a single matrix, as follows:

$$\overline{S}(w^{Cb}, w^{Cr}) = \begin{bmatrix} \overline{s}_0^T(w^{Cb}, w^{Cr}) \\ \overline{s}_1^T(w^{Cb}, w^{Cr}) \\ \vdots \\ \overline{s}_{P-1}^T(w^{Cb}, w^{Cr}) \end{bmatrix} \quad (40)$$

The optimal values for the forward reshaping MMR matrix (or function) $M_F$ can be obtained via the least squared solution, as follows:

$$M_F(w^{Cb}, w^{Cr}) = (\overline{U}^T\overline{U})^{-1}(\overline{U}^T\overline{S}(w^{Cb}, w^{Cr})) \quad (41)$$

Predicted chroma values may be predicted or generated as follows:

$$\tilde{C}(w^{Cb}, w^{Cr}) = \begin{bmatrix} \tilde{c}_0^T(w^{Cb}, w^{Cr}) \\ \tilde{c}_1^T(w^{Cb}, w^{Cr}) \\ \vdots \\ \tilde{c}_{P-1}^T(w^{Cb}, w^{Cr}) \end{bmatrix} = \overline{U} M_F(w^{Cb}, w^{Cr}) \quad (42)$$

where $$\tilde{c}_p(w^{Cb}, w^{Cr}) = \begin{bmatrix} c_p^{Cb}(w^{Cb}, w^{Cr}) \\ c_p^{Cr}(w^{Cb}, w^{Cr}) \end{bmatrix} \quad (43)$$

Likewise, for backward reshaping, forward reshaped codewords decoded by a downstream device may be represented as follows:

$$h_p(w^{Cb}, w^{Cr}) = \begin{bmatrix} c_p^Y \\ c_p^{Cb}(w^{Cb}, w^{Cr}) \\ c_p^{Cr}(w^{Cb}, w^{Cr}) \end{bmatrix} \quad (44)$$

For an image/frame with a P number of chroma pixel values in each of the chroma channels, all the P number of pixel values in a forward reshaped image may be placed in a single matrix, as follows:

$$\overline{H}(w^{Cb}, w^{Cr}) = \begin{bmatrix} \overline{h}_0^T(w^{Cb}, w^{Cr}) \\ \overline{h}_1^T\overline{s}(w^{Cb}, w^{Cr}) \\ \vdots \\ \overline{h}_{P-1}^T(w^{Cb}, w^{Cr}) \end{bmatrix} \quad (45)$$

The optimal values for the backward reshaping MMR matrix (or function) $M_B$ can be obtained via the least squared solution, as follows:

$$M_B(w^{Cb}, w^{Cr}) = (\overline{H}^T(w^{Cb}, w^{Cr})\overline{H}(w^{Cb}, w^{Cr}))^{-1}$$
$$(\overline{H}^T(w^{Cb}, w^{Cr})\overline{Q}) \quad (46)$$

Backward reshaped chroma codewords in a reconstructed image that is identical to or approximates an input image from which the forward reshaped image is generated by forward reshaping may be predicted or generated as follows:

$$\hat{V}(w^{Cb}, w^{Cr}) = \begin{bmatrix} \hat{v}_0^T(w^{Cb}, w^{Cr}) \\ \hat{v}_1^T(w^{Cb}, w^{Cr}) \\ \vdots \\ \hat{v}_{P-1}^T(w^{Cb}, w^{Cr}) \end{bmatrix} = \overline{H}(w^{Cb}, w^{Cr})M_B(w^{Cb}, w^{Cr}) \quad (47)$$

where $$\hat{v}_P(w^{Cb}, w^{Cr}) = \begin{bmatrix} \hat{v}_P^T(w^{Cb}, w^{Cr}) \\ \hat{v}_P^T(w^{Cb}, w^{Cr}) \end{bmatrix} \quad (48)$$

The scaling factor ($w^{Cb}, w^{Cr}$) may be carefully chosen to ensure that the predicted chroma codewords are within a constrained range such as a normalized range (0 1).

EDR Fidelity Improvement

If fidelity of the reconstructed images in reference to the input images is important, the scaling factor ($w^{Cb}, w^{Cr}$) can be adjusted in a way such that the backward reshaped codewords have minimal distortion/error/gap/cost from codewords in the (original) input images (117). However, by doing so, it may imply that fidelity of the forward reshaped images in reference to the reference tone-mapped images (117-1) may be impacted or sacrificed to some extent.

In some embodiments, in addition to or in place of adjusting the scaling factor ($w^{Cb}, w^{Cr}$) for the purpose of controlling color saturation, the scaling factor ($w^{Cb}, w^{Cr}$) may be adjusted for the purpose of controlling the fidelity of the reconstructed images in reference to the input images.

For example, the optimization problem can be formulated to minimize a distortion between the chroma codewords $\overline{Q}$ of the input image and backward reshaped chroma codewords $\hat{V}(w^{Cb}, w^{Cr})$ of the reconstructed image that is identical to or approximates the input image. Additionally, optionally, or alternatively, a solution to the optimization problem may be subjected to an acceptable range of saturation in the forward reshaped images. The solution, or the backward reshaping MMR matrix $M_B$, can be selected or generated by minimizing the distortion as follows:

$$\min_{\{w^{Cb}, w^{Cr}\}} \left\| \hat{V}(w^{Cb}, w^{Cr}) - \overline{Q} \right\|^2 \quad (49)$$

$$\text{s.t.} \begin{bmatrix} w_{min} \le w^{Cb} \le w_{max} \\ w_{min} \le w^{Cr} \le w_{max} \end{bmatrix}$$

where $\{w_{min}, w_{max}\}$ may be used to define an acceptable saturation range in the forward reshaped images (e.g., the SDR look, etc.), or an optimal saturation range in the forward reshaped images.

While it is possible to do a full search over all continuous values in a range between $\{w_{min}, w_{max}\}$, in some embodiments, to make the solution simple, a (e.g., full) search may be conducted for discretized values in the range between $\{w_{min}, w_{max}\}$ rather than all the continuous values in the range.

Example Process Flows

FIG. 4A illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 402, an image processing device determines a tone-mapping function that maps one or more input images of a high dynamic range into one or more reference tone-mapped images of a relatively narrow dynamic range.

In block 404, the image processing device derives, based on a plurality of first bit depths and a plurality of second bit depths, a luma forward reshaping function for forward reshaping luma codewords of the one or more input images into forward reshaped luma codewords of one or more forward reshaped images of the relatively narrow dynamic range, the one or more forward reshaped images approximating the one or more reference tone-mapped images.

In block 406, the image processing device derives a chroma forward reshaping mapping for predicting chroma codewords of the one or more forward reshaped images, the chroma forward reshaping mapping using chroma codewords and the luma codewords of the one or more input images as input, the chroma forward reshaping mapping using the chroma codewords of the one or more reference tone-mapped images as a prediction target.

In block 408, the image processing device generates backward reshaping metadata that is to be used by one or more recipient devices to generate a luma backward reshaping function and a chroma backward reshaping mapping.

In block 410, the image processing device transmits the one or more forward reshaped images with the backward reshaping metadata to the one or more recipient devices.

In an embodiment, one or both of the one or more input images or the one or more reference tone-mapped images are generated in post-production editing.

In an embodiment, the plurality of first bit depths is determined in a plurality of codeword bins based on noise levels that are determined in the plurality of codeword bins based on the luma codewords of the one or more input images; the plurality of codeword bins covers the high dynamic range.

In an embodiment, the plurality of second bit depths is determined in a plurality of codeword bins based on the tone-mapping function; the plurality of codeword bins covers the high dynamic range.

In an embodiment, the chroma forward reshaping mapping is derived by optimizing a cost function constructed the chroma codewords and the luma codewords of the one or more input images as the input and the chroma codewords of the one or more reference tone-mapped images as the prediction target.

In an embodiment, the one or more forward reshaped images are encoded in a video signal of the relatively narrow dynamic range; the backward reshaping metadata is carried in the video signal as metadata separate from the one or more forward reshaped image.

In an embodiment, the video signal excludes one or both of the one or more input images or the one or more reference tone-mapped images.

In an embodiment, the image processing device is further configured to downsample the luma codewords of the one or more input images before the luma codewords of the one or more input images are used as a part of the input for deriving the chroma forward reshaping mapping.

In an embodiment, the one or more input images are represented in a different color space than that in which the one or more reference tone-mapped images are represented.

In an embodiment, the one or more input images are formatted in a different sampling format than that in which the one or more reference tone-mapped images are formatted.

In an embodiment, at least one of the one or more input images or the one or more reference tone-mapped images are represented in one of: an IPT PQ (ICtCp) color space, an YCbCr color space, an RGB color space, a Rec. 2020 color space, a Rec. 709 color space, an extended dynamic range (EDR) color space, a PQ color space, a HLG color space, a gamma color space, a standard dynamic range (SDR) color space, etc.

In an embodiment, the one or more forward reshaped images are represented in a reshaped domain; the reshaped domain is of a bit depth of one of 8, 9, 10, 11+ bits, etc.

In an embodiment, the one or more input images are represented in a pre-reshaped domain; the pre-reshaped domain is of a bit depth of one of 12, 13, 14, 15+ bits, etc.

In an embodiment, the luma forward reshaping function is constructed based on a plurality of third bit depths; the plurality of third bit depths is derived based on the plurality of first bit depths and the plurality of second bit depths; each third bit depth in the plurality of third bit depths corresponds to a respective first bit depth in the plurality of first bit depths and a respective second bit depth in the plurality of second bit depths; each third bit depth in the plurality of third bit depths is not less than a respective first bit depth in the plurality of first bit depths and no more than a respective second bit depth in the plurality of second bit depths.

In an embodiment, the luma backward reshaping function is constructed based on the luma codewords of the one or more input images and the luma codewords of the one or more forward reshaped images.

In an embodiment, the chroma backward reshaping mapping is generated for predicting chroma codewords of one or more backward reshaped images that approximate the one or more input images, the chroma backward reshaping mapping using the chroma codewords and the luma codewords of the one or more forward reshaped images as input, the chroma backward reshaping mapping using the chroma codewords of the one or more input images as a prediction target.

In an embodiment, the image processing device is configured to perform: applying a scaling factor for controlling color saturation to the chroma codewords of the one or more reference tone-mapped images; generating the chroma forward reshaping function based at least in part on the chroma codewords, after having been applied with the scaling factor, of the one or more reference tone-mapped images; etc.

In an embodiment, the image processing device is configured to perform: determining a chroma forward reshaping cost function and a chroma backward reshaping cost function both of which are dependent on a scaling factor, the chroma forward reshaping cost function being used to generate the chroma forward reshaping mapping, the chroma backward reshaping cost function being used to generate the chroma backward reshaping mapping; searching for an optimized value of the scaling factor that minimizes a distortion between one or more reconstructed images generated based at least in part on the chroma backward reshaping mapping and the one or more input images.

Figure 4B:
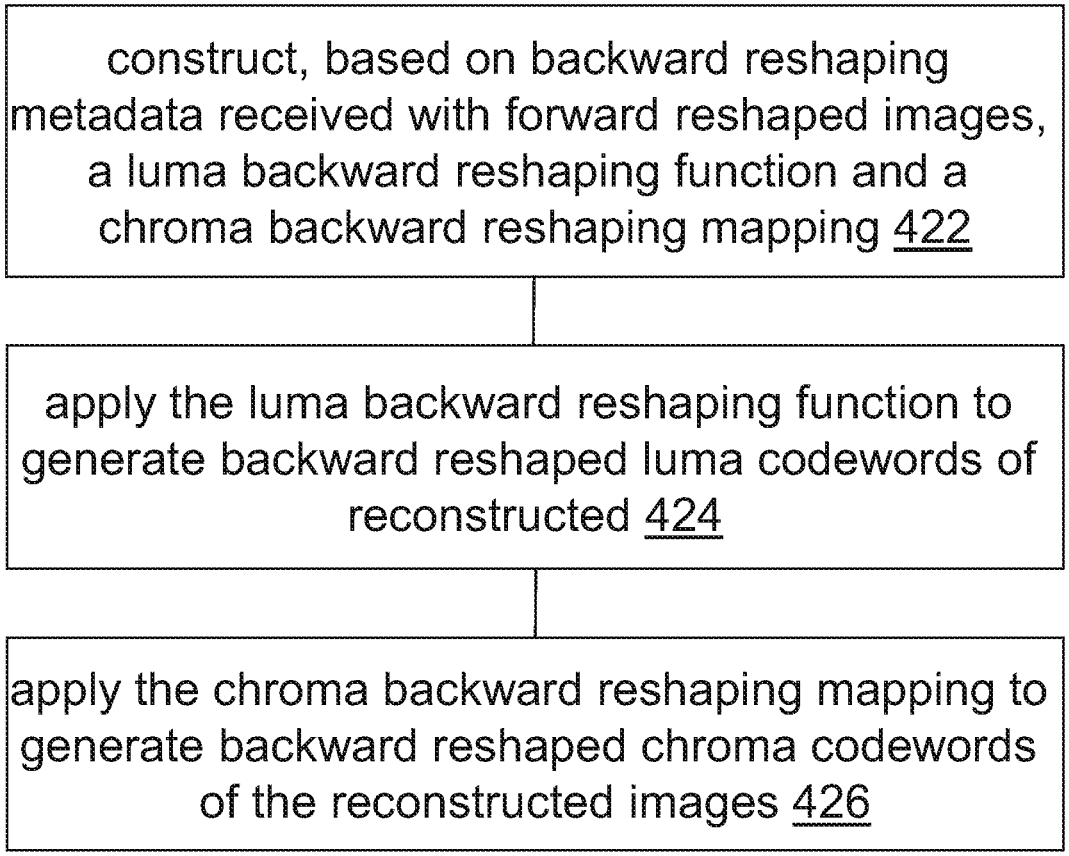

FIG. 4B illustrates an example process flow according to an embodiment of the present invention. In some embodiments, one or more computing devices or components (e.g., an encoding device/module, a transcoding device/module, a decoding device/module, a tone mapping device/module, a graphic blending device, an image blending device/module, a media device/module, etc.) may perform this process flow. In block 422, an image processing device constructs, based on backward reshaping metadata received with one or more forward reshaped images of a relatively narrow dynamic range, a luma backward reshaping function and a chroma backward reshaping mapping.

In block 424, the image processing device applies the luma backward reshaping function to forward reshaped luma codewords of the one or more forward reshaped images to generate backward reshaped luma codewords of one or more reconstructed images of a high dynamic range that approximate one or more input images of the high dynamic range.

In block 426, the image processing device applies the chroma backward reshaping mapping to map forward reshaped chroma codewords and the forward reshaped luma codewords of the one or more forward reshaped images to backward reshaped chroma codewords of the one or more reconstructed images.

In an embodiment, the one or more forward reshaped images are decoded from a video signal of the relatively narrow dynamic range; the backward reshaping metadata is carried in the video signal as metadata separate from the one or more forward reshaped image.

In an embodiment, the video signal excludes one or both of the one or more input images or one or more reference tone-mapped images which the one or more forward reshaped images approximate.

In an embodiment, the image processing device is further configured to downsample the forward reshaped luma codewords of the one or more forward reshaped images before the chroma backward reshaping mapping is applied to the forward reshaped chroma codewords and the forward reshaped luma codewords of the one or more forward reshaped images.

In an embodiment, the one or more reconstructed images are represented in a different color space than that in which the one or more forward reshaped images are represented.

In an embodiment, the one or more reconstructed images are formatted in a different sampling format than that in which the one or more forward reshaped images are formatted.

In an embodiment, at least one of the one or more reconstructed images or the one or more forward reshaped images are represented in one of: an IPT-PQ (ICtCp) color space, an YCbCr color space, an RGB color space, a Rec. 2020 color space, a Rec. 709 color space, an extended dynamic range (EDR) color space, a gamma/PQ/HLG color space, a standard dynamic range (SDR) color space, etc.

In an embodiment, the one or more forward reshaped images are represented in a reshaped domain; the reshaped domain is of a bit depth of one of 8, 9, 10, 11+ bits, etc.

In an embodiment, the one or more reconstructed images are represented in a pre-reshaped domain; the pre-reshaped domain is of a bit depth of one of 10, 11, 12, 13, 14, 15+ bits, etc.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Joint Luma and Chroma Reshaping

In the methods described earlier, the luma and chroma reshaping functions are derived independently of each other. Under certain scenarios, for example, when the input EDR signal (117) is coded in BT. Rec. 2020 and the input reference SDR (117-1) is in Rec. 709, then the decoder SDR signal (e.g., 140-1) may exhibit color artifacts, such as reduced color saturation. Hence, in some embodiments, it may be beneficial to derive the luma and chroma reshaping functions by taking into consideration both the luma and chroma characteristics of the input signals. Due to the increased computational cost in such joint optimization techniques, a variety of optimal and sub-optimal techniques are proposed herein. An optimal 3D-LUT EDR to SDR mapping for an entire scene is described first. The optimal 3D-LUT mapping serves as a reference point. 3D histograms for an entire scene are also collected to help understand the pixel distribution and derive the forward reshaping functions. The optimal solution in each luminance range will be searched via a cost function. The chroma reshaping can be determined iteratively as well. In addition, a simplified, but very fast, solution for luma reshaping is proposed.

Optimal 3D-LUT

In an embodiment, each color component, denoted as y, c0, and c1, representing luma and chroma, (e.g., Y, Cb, Cr or I, Cp, and Ct, and the like) of the input EDR signal can be sub-divided into M bins (e.g., M=256). In some embodiments, without loss of generality, each color component may be normalized to be in the (0, 1) range. The number of bins depends on the available computational resources (that is, one may use a larger M for better accuracy, but at a higher computation cost). To simplify notation, each color component is divided into the same number of bins; however, other embodiments may use different number of bins for each color component. Using pseudocode, an optimal 3D-LUT for mapping EDR input samples to SDR output samples according to SDR reference samples, can be constructed as follows:

```
// initialization
h^y(b^y,b^c0,b^c1) = 0     for all bin index (b^y,b^c0,b^c1)
w_y^s(b^y,b^c0,b^c1) = 0    for all bin index (b^y,b^c0,b^c1)
w_c0^s(b^y,b^c0,b^c1) = 0   for all bin index (b^y,b^c0,b^c1)
w_c1^s(b^y,b^c0,b^c1) = 0   for all bin index (b^y,b^c0,b^c1)
// scan for each pixel
for each frame j
  for each pixel i in EDR
    find EDR value (v_ji^y,v_ji^c0,v_ji^c1) and co-located SDR pixel value
      (s_ji^y,s_ji^c0,s_ji^c1)
    find bin index for (v_ji^y,v_ji^c0,v_ji^c1) as (b_ji^y,b_ji^c0,b_ji^c1)
    h^y(b_ji^y,b_ji^c0,b_ji^c1)++                                            (50a)
    w_y^s(b_ji^y,b_ji^c0,b_ji^c1)+= s_ji^y     // add co-located SDR value
    w_c0^s(b_ji^y,b_ji^c0,b_ji^c1)+= s_ji^c0   // add co-located SDR value
    w_c1^s(b_ji^y,b_ji^c0,b_ji^c1)+= s_ji^c1   // add co-located SDR value
  end
end
// for each bin, find optimal 3D-LUT
for each (b^y,b^c0,b^c1)
  if(h^y(b^y,b^c0,b^c1) > 0 )
```

$$s^y(b^y,b^{c0},b^{c1}) = \frac{w_y^s(b^y,b^{c0},b^{c1})}{h^y(b^y,b^{c0},b^{c1})} \quad (50b)$$

$$s^{c0}(b^y,b^{c0},b^{c1}) = \frac{w_{c0}^s(b^y,b^{c0},b^{c1})}{h^y(b^y,b^{c0},b^{c1})}$$

$$s^{c1}(b^y,b^{c0},b^{c1}) = \frac{w_{c1}^s(b^y,b^{c0},b^{c1})}{h^y(b^y,b^{c0},b^{c1})}$$

```
  else
    need to interpolate from available neighbors
  end
end
```

Given an EDR pixel value and its associated bins (e.g., $(b^y,b^{c0},b^{c1})$) equations (50b) represent three 3D-LUTs which can be used to generate the corresponding reshaped SDR signal $(s^y(b^y,b^{c0},b^{c1}), s^{c0}(b^y,b^{c0},b^{c1}), s^{c1}(b^y,b^{c0},b^{c1}))$. The values of $h^y(b^y,b^{c0},b^{c1})$ in equation (50a) represent a 3D histogram of the input data.

For each luma slice, i.e. all different combinations ($b^{c0}$, $b^{c1}$) for the same $b^y$ at bin m, one can determine the minimal mapped SDR luma value and maximal mapped SDR luma value as:

$$s_m^{y,min} = \min\{s^y(m,b^{c0},b^{c1}) | \forall (b^{c0},b^{c1})\},$$

$$s_m^{y,max} = \max\{s^y(m,b^{c0},b^{c1}) | \forall (b^{c0},b^{c1})\}. \quad (51)$$

Then, in an embodiment, the optimal 1D-LUT for luma at bin m can be constructed via $$s_m^{y,opt1D} = \frac{\sum_{b^{c0}} \sum_{b^{c1}} h^y(m, b^{c0}, b^{c1}) \cdot s^y(m, b^{c0}, b^{c1})}{\sum_{b^{c0}} \sum_{b^{c1}} h^y(m, b^{c0}, b^{c1})}. \quad (52)$$

Note that $s_m^{y,min} \leq s_m^{y,opt} \leq s_m^{y,max}$.

Joint-reshaping—Algorithm Overview

Figure 6:
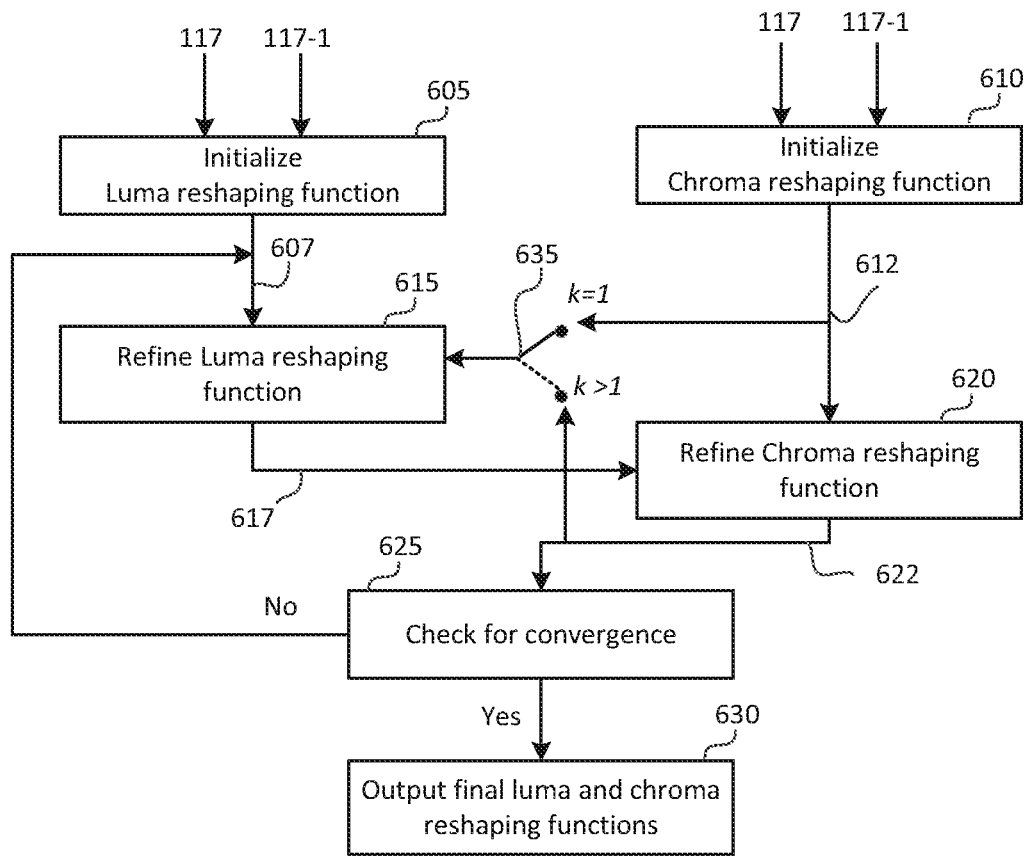
FIG. 6 illustrates an example process for the joint development of a luma and a chroma reshaping function according to an embodiment of this invention.

The ultimate goal is to generate: (a) a 1-D LUT mapping luminance EDR values into mapped luminance SDR values, and (b) an MMR-based prediction function for chroma. The luminance mapping may be denoted as $\hat{s}_j^{(k),y} = L_j^{(k)}(v_j^y)$, where $\hat{s}_j^{(k),y}$ denotes the mapped SDR luminance values for the j-th frame after the k-th iteration, $v_j^y$ denotes the input EDR luminance, and $L_j^{(k)}(.)$ denotes the corresponding mapping function. For k=0, the luma and chroma mappings may be generated using the methods discussed earlier. For k>0, the two mapping may be refined according to some optimization criterion, e.g., checking and optimizing the color difference between the reference SDR values (117-1) and the reshaped values (182). As depicted in FIG. 6, at a high level, an iterative, joint-luma-chroma reshaping algorithm may be expressed as follows:

STEP 1 (Initialization) (steps 605 and 610): For iteration k=0, given EDR input (117) and its corresponding reference SDR input (117-1), one may generate reshaped SDR luma $\hat{s}_{ji}^{(0),y}$ and reshaped SDR chroma $\hat{s}_{ji}^{(0),c0}$ and $\hat{s}_{ji}^{(0),c1}$ independently of each other, as described earlier. Thus, step (605) may generate $L_j^{(0)}(v_j^y)$ (607), and step (610) may generate MMR set $M_j^{F,(0)}$ (612).

STEP 2 (refinement of the luma reshaping function) (step 615): For iteration k (k>0), one may refine the luma mapping based on the color difference and a cost function based on the result from iteration k−1 (i.e. $\hat{s}_{ji}^{(k-1),c0}$ and $s_{ji}^{(k-1),c1}$). Note that through "switch" 635, for k=1, $\hat{s}_{ji}^{(k-1),c0}$ and $\hat{s}_{ji}^{(k-1),c1}$ values are read from the output of step (610), and for k>1, they are read from the output of step (620). Since the luma mapping is a 1D-LUT, basically it is a quantization process. For example, in an embodiment, one may partition the input EDR input into M bins. For the m-th bin (where m=0, 1, . . . , M-1), one may identify all pixels in the EDR image, $v_{ji}^y$, which have the pixel value in the range $$\left[\frac{m}{M}, \frac{m+1}{M}\right).$$

Denote the set within the m-th bin as $$\Psi_{j,m} = \left\{i \,\bigg|\, \frac{m}{M} \le v_{ji}^y < \frac{m+1}{M}\right\}.$$

All pixels within this bin will map to a single SDR value, $\hat{s}_j^{(k,m),y}$, i.e.

$$\hat{s}_j^{(k,m),y} = L_j^{(k)}(v_{ji}^y) \text{ for all } v_{ji}^y \in \Psi_{j,m}.$$

The goal is to find the optimal $L_j^{(k)}$ in iteration k. Note that this optimization problem can be partitioned into M sub-problems, one for each bin. For the m-th bin, the optimization problem may be expressed as $$\hat{s}_j^{*(k,m),y} = \arg\min_{\hat{s}_j^{*(k,m),y}} \sum_{i \in \Psi_{j,m}} f^{(k)}\left((\hat{s}_j^{(k,m),y}, s_{ji}^y), (\hat{s}_{ji}^{(k-1),c0}, s_{ji}^{c0}), (\hat{s}_{ji}^{(k-1),c1}, s_{ji}^{c1})\right), \quad (53)$$

where $f^{(k)}(\bullet)$ is a cost function measuring the difference for color in 3D color space. Thus, step (615) may generate $L_j^{(k)}(v_j^y)$ (617).

STEP 3 (refinement of the chroma reshaping function) (step 620): After refining the luma reshaping function, one may return to refine the chroma reshaping function. Since chroma uses MMR, which is a global operator different from the 1D-LUT used in luma, the optimization problem can't be partitioned into several sub-problems. In an embodiment, a cost function measuring the difference between reference SDR and generated SDR at the k-th iteration is used to determine a weighting factor for an MMR-based solution. Let the i-th pixel at frame j be denoted as the following vector $$u_{ji} = \begin{bmatrix} v_{ji}^y \\ v_{ji}^{c0} \\ v_{ji}^{c1} \end{bmatrix}. \quad (54)$$

Without limitation, given a second order MMR model, the corresponding MMR vector, $\bar{u}_{ji}$, based on as $u_{ji}$ can be expressed as:

$$\bar{u}_{ji} = [1 \; v_{ji}^y \; v_{ji}^{c0} \; v_{ji}^{c1} \; v_{ji}^y \cdot v_{ji}^{c0} \; v_{ji}^y \cdot v_{ji}^{c1} \; v_{ji}^{c0} \cdot v_{ji}^{c1} \\ v_{ji}^y \cdot v_{ji}^{c0} \cdot v_{ji}^{c1} \; (v_{ji}^y)^2 \; (v_{ji}^{c0})^2 \; (v_{ji}^{c1})^2 \; (v_{ji}^y \cdot v_{ji}^{c0})^2 \\ (v_{ji}^y \cdot v_{ji}^{c1})^2 \; (v_{ji}^{c0} \cdot v_{ji}^{c1})^2 \; (v_{ji}^y \cdot v_{ji}^{c0} \cdot v_{ji}^{c1})^2]. \quad (55)$$

Denote the two chroma channels of the available SDR reference as $$\bar{s}_{ji} = \begin{bmatrix} s_{ji}^{c0} \\ s_{ji}^{c1} \end{bmatrix}.$$

Let $$\tilde{c}_{ji}^{(k)} = \begin{bmatrix} \hat{s}_{ji}^{(k),c0} \\ \hat{s}_{ji}^{(k),c1} \end{bmatrix}$$

denote the chroma component of the reshaped SDR output. For a picture with P chroma pixels, let:

$$\bar{U}_j = \begin{bmatrix} \bar{u}_{j,0}^T \\ \bar{u}_{j,1}^T \\ \vdots \\ \bar{u}_{j,P-1}^T \end{bmatrix} \text{ and } \bar{S}_j = \begin{bmatrix} \bar{s}_{j,0}^T \\ \bar{s}_{j,1}^T \\ \vdots \\ \bar{s}_{j,P-1}^T \end{bmatrix}.$$

Then, the predicted value is $$\tilde{C}_j = \begin{bmatrix} \tilde{c}_{j,0}^T \\ \tilde{c}_{j,1}^T \\ \vdots \\ \tilde{c}_{j,P-1}^T \end{bmatrix} = \bar{U}_j M_j^{F,(k)},$$

where $M_j^{F,(k)}$ denotes the forward reshaping chroma mapping. For the frame-based solution, our goal is to find the MMR coefficients for each frame j such that the difference between $\tilde{C}_j$ and $\bar{S}_j$ is weighted minimized via weighting matrix $W_j^{(k)}$:

$$\arg\min_{M_j^{F,(k)}} (\bar{S}_j - \bar{U}_j M_j^{F,(k)})^T W_j^{(k)} (\bar{S}_j - \bar{U}_j M_j^{F,(k)}). \quad (56)$$

The optimal chroma forward reshaping function $M_j^{F,(k)}$ can then be obtained via the least squared solution.

$$M_j^{F,(k)} = (\bar{U}_j^T W_j^{(k)} \bar{U}_j)^{-1} (\bar{U}_j^T W_j^{(k)} \bar{S}_j). \quad (57)$$

The weighting matrix $W_j^{(k)}$ is a diagonal matrix with dimension P×P and has the following form $$W_j^{(k)} = \begin{bmatrix} w_{j,0}^{(k)} & \cdots & 0 \\ \vdots & \ddots & \vdots \\ 0 & \cdots & w_{j,P-1}^{(k)} \end{bmatrix}. \quad (58)$$

The weighting factor is a cost function between the reference SDR and the generated SDR luma at iteration k and chroma at iteration k-1.

$$w_{j,i}^{(k)} = g^{(k)}\left((\hat{s}_j^{*(k,m),y}, s_{ji}^y), (\hat{s}_{ji}^{(k-1),c0}, s_{ji}^{c0}), (\hat{s}_{ji}^{(k-1),c1}, s_{ji}^{c1})\right),$$

where $g^{(k)}(\bullet)$ is a cost function. Note that at iteration k=0, $w_{j,i}^{(0)}=1$. Thus, step (620) may generate MMR set $M_j^{F,(k)}$ (622).

STEP 4 (check convergence) (step 625): The process may be repeated from STEP 2 (615) until there is convergence, that is, it is computed that further iterations do not seem to improve the luma and chroma cost functions according to certain criteria. Upon convergence, the process terminates and the final luma and chroma reshaping functions are output (step 630).

Steps 1-4 may be very computationally intensive. In the rest of this discussion, alternative and more cost effective implementations will be described so that encoders may select the approach that best matches the available computational resources.

Chroma Initialization

Returning to STEP 1 (610), the initial MMR coefficients (e.g., $M_j^{F,(0)}$), as described earlier, may be computed as follows:

For a frame-based solution:

$$A_j^F = \overline{U}_j^T \overline{U}_j$$

$$B_j^F = \overline{U}_j^T \overline{S}_j$$

$$M_j^{F,(0)} = (A_j^F)^{-1}(B_j^F) \qquad (59)$$

For a scene-based solution, with F frames in the scene:

$$A^F = \sum_{j=0}^{F-1} \overline{U}_j^T \overline{U}_j, \qquad (60)$$

$$B^F = \sum_{j=0}^{F-1} \overline{U}_j^T \overline{S}_j,$$

$$M^{F,(0)} = (A^F)^{-1}(B^F).$$

A first step in reducing computational complexity is to replace "pixel-based" computations with "voxel-based" computations. Since the EDR input range is sub-divided into M×M×M pixel cubes, one can determine the center value in each pixel cube (or voxel). For a fixed partition of every frame or every scene, the center value in each cube is fixed. For cube $(\alpha,\beta,\gamma)$, the center value is $$v^y(\alpha) = \frac{\alpha + 0.5}{M}, \qquad (61)$$

$$v^{c0}(\beta) = \frac{\beta + 0.5}{M},$$

$$v^{c1}(\gamma) = \frac{\gamma + 0.5}{M}.$$

Then, from equations (54) and (55)

$$u(\alpha, \beta, \gamma) = \begin{bmatrix} v^y(\alpha) \\ v^{c0}(\beta) \\ v^{c1}(\gamma) \end{bmatrix},$$

and $$\overline{u}(\alpha, \beta, \gamma) = [\, 1 \quad v_j^y(\alpha) \quad v^{c0}(\beta) \quad v^{c1}(\gamma)$$
$$v^y(\alpha) \cdot v^{c0}(\beta) \quad v^y(\alpha) \cdot v^{c1}(\gamma)$$
$$v^{c0}(\beta) \cdot v^{c1}(\gamma) \quad v^y(\alpha) \cdot v^{c0}(\beta) \cdot v^{c1}(\gamma)$$
$$v^y(\alpha)^2 \quad v^{c0}(\beta)^2 \quad v^{c1}(\gamma)^2$$
$$v^y(\alpha) \cdot v^{c0}(\beta))^2 \quad (v^y(\alpha) \cdot v^{c1}(\gamma))^2$$
$$(v^{c0}(\beta) \cdot v^{c1}(\gamma))^2 \quad (v^y(\alpha) \cdot v^{c0}(\beta) \cdot v^{c1}(\gamma))^2 \,]$$

Finally, given $M_j^{F,(0)}$, the predicted chroma from $\overline{u}(\alpha,\beta,\gamma)$ is given by $$\tilde{c}_j^{(0)}(\alpha, \beta, \gamma) = \begin{bmatrix} \hat{s}_j^{(0),c0}(\alpha, \beta, \gamma) \\ \hat{s}_j^{(0),c1}(\alpha, \beta, \gamma) \end{bmatrix}^T = \overline{u}(\alpha, \beta, \gamma) M_j^{F,(0)}. \qquad (62)$$

Refinement of the Luma-Reshaping Function

Returning to STEP 2 (615), as discussed earlier, see equation (53), determining the optimum reshaping function may be expressed as an optimization problem trying to generate a luma remapping such that the chroma difference between the reference SDR and the reshaped SDR is minimized according to some color-difference measurement.

Let $D^{(k),y}(\alpha,\beta,\gamma)$ denote the color difference measurement function for pixel-cube (or voxel) $(\alpha,\beta,\gamma)$. This function may also be expressed as:

$$D^{(k),y}(\alpha,\beta,\gamma) = \tilde{D}^{(k),y}((\hat{s}_j^{(k,\alpha),y}, s_j^y(\alpha,\beta,\gamma)), (\hat{s}_j^{(k-1),c0}(\alpha,\beta,\gamma), s_j^{c0}(\alpha,\beta,\gamma)), (\hat{s}_j^{(k-1),c1}(\alpha,\beta,\gamma), s_j^{c1}(60,\beta,\gamma))), \qquad (63)$$

where $\tilde{D}^{(k),y}(\bullet)$ is another function to be discussed in more detail later on.

Note that there are $h^y(\alpha,\beta,\gamma)$ pixels at cube $(\alpha,\beta,\gamma)$. Given that the distortion at cube $(\alpha,\beta,\gamma)$ can be expressed as $$f^{(k)}(\alpha,\beta,\gamma) = h^y(\alpha,\beta,\gamma) \cdot D^{(k),y}(\alpha,\beta,\gamma), \qquad (64a)$$

the overall distortion in the $\alpha$-th luminance slice when choosing $\hat{s}_j^{(k,\alpha),y}$ is $$E^{(k)}(\alpha) = \sum_{\beta=0}^{M-1}\sum_{\gamma=0}^{M-1} f^{(k)}(\alpha, \beta, \gamma). \qquad (64b)$$

From the earliest discussion, $\hat{s}_j^{(k,\alpha),y}$ has a lower bound and upper bound given by $$s_\alpha^{y,min} \leq \hat{s}_j^{(k,\alpha),y} \leq s_\alpha^{y,max},$$

hence, at the voxel level, in the $\alpha$-th luminance slice, the optimal solution is given by $$\hat{s}_j^{*(k,\alpha),y} = \arg\min_{s_\alpha^{y,min} \leq \hat{s}_j^{(k,\alpha),y} \leq s_\alpha^{y,max}} \sum_{\beta=0}^{M-1}\sum_{\gamma=0}^{M-1} f^{(k)}(\alpha, \beta, \gamma). \qquad (65)$$

The set of $\hat{s}_j^{*(k,\alpha),y}$ values from equation (65), for $0 \leq \alpha \leq M-1$ (e.g. M=256) can now be used to derive a pixel-based reshaping function, or its corresponding inverse (or backward) reshaping function (e.g., using equation (24)). Such a function needs to have several preferred characteristics, such as: being monotonically non-decreasing, applicable to all possible input EDR values, and smooth. These problems and proposed solutions are discussed next.

The optimal solution $\{\hat{s}_j^{*(k,\alpha),y}\}$ may not be a monotonically non-decreasing function, which is a requirement for constructing the forward reshaping function. Thus, the optimal solution $\{\hat{s}_j^{*(k,\alpha,y)}\}$ needs to be adjusted to satisfy the requirement. In U.S. Provisional Patent Application Ser. No. 62/404,307, filed on Oct. 5, 2016, "*Inverse luma/chroma mappings with histogram transfer and approximation*," which is incorporated herein by reference in its entirety, B. Wen et al. used histogram and cumulative density function (CDF) information for the efficient generation of monotonically non-decreasing reshaping functions. Thus, a similar approach will be employed herein as well.

The first step is to build EDR and SDR histograms. For the EDR histogram, one may use the same algorithm as the one used to derive the optimal 3D-LUT (see steps to compute $h^v(b_{ji}^y, b_{ji}^{c0}, b_{ji}^{c1})$ in equation (50a)). Then, for each $\alpha$ slice.

$$\text{for } \alpha = 0, 1, \ldots, M-1 \qquad (66)$$
$$\overline{h}^v(\alpha) = \sum_{\beta=0}^{M-1}\sum_{\gamma=0}^{M-1} h^v(\alpha, \beta, \gamma)$$
$$\text{end}$$

The SDR histogram can be simply built via finding the mapped index from EDR to SDR and summing up the bin count.

```
// initialization
h̄ˢ(α) = 0      for α = 0, 1, ... , M−1
for α = 0, 1, ... , M−1
    // find the mapped SDR bin index ᾱ from EDR bin index α   (67)
    ᾱ = ⌊M · ŝ*ⱼ^(k,α),y⌋
    // update SDR ᾱ bin histogram by adding from EDR α bin
    h̄ˢ(ᾱ) = h̄ˢ(ᾱ) + h̄ᵛ(α)
end
```

Having $\{\overline{h}^v(\alpha)\}$ and $\{\overline{h}^s(\alpha)\}$, one can now apply the CDF matching method.
(1) Build CDF $\{\overline{c}^v(\alpha)\}$ and $\{\overline{c}^s(\alpha)\}$ values based, respectively, on the EDR and SDR histograms, $$\overline{c}^v(\alpha) = \sum_{i=0}^{\alpha} \overline{h}^v(i) \text{ and } \overline{c}^s(\alpha) = \sum_{i=0}^{\alpha} \overline{h}^s(i). \qquad (68)$$

(2) For each input value of $\alpha$, given the CDF value $\overline{c}^v(\alpha)$, find the bin index $\alpha'$ in $\{\overline{c}^s(\alpha)\}$ such that $\overline{c}^s(\alpha') \leq \overline{c}^v(\alpha) \leq \overline{c}^s(\alpha'+1)$. If there is no exact value for $\alpha'$, then one may apply simple interpolation $$\alpha^+ = \alpha' + \frac{\overline{c}^v(\alpha) - \overline{c}^s(\alpha')}{\overline{c}^s(\alpha'+1) - \overline{c}^s(\alpha')}. \qquad (69)$$

(3) Finally, map $\{\alpha\}$ to $\{\alpha^+\}$
This mapping guarantees a monotonically non-decreasing property. Denote this new mapping as $F_j^{M(k)}(\alpha)$.

Given input value of $\alpha$ and corresponding optimal $\hat{s}_j^{*(k,\alpha),y}$, one may apply known interpolation techniques to map all possible input pixel values $(v_{ji}^y)$ and thus derive the forward reshaping LUT $F_j^v(v_{ji}^y)$. In an embodiment, the elements of this LUT may be smoothed using a simple low-pass filter, such as $$FLUT_j^{(k)}(x) = \sum_{r=-W}^{W} \frac{1}{2W+1} F_j^v(x+r), \qquad (70)$$

where W denotes a filtering-window parameter (e.g, W=8).
This process is summarized in block (615) of FIG. 7, which depicts an example of the process for generating refined luma and chroma reshaping functions according to an embodiment. In the beginning (705), given the input EDR and reference SDR values, a 3D histogram is generated (see equation (50a)). In step (710), for each luminance slice $\alpha$, given a cost function ($f^{(k)}(\bullet)$) that may take into consideration the difference between the reference SDR (117-1) values and the reshaped SDR values from iteration (k−1), the overall cost is computed (see equation (64b). Given the total cost per slice and the luminance range of the reshaped luma values, step (715) computes the optimal reshaping (see equation (65)). In step (720), the CDF mapping step guarantees a monotonically, non-decreasing, reshaping function. Finally, in step (725), given the output of the CDF mapping step, interpolating and filtering functions may be applied to generate a smooth luma reshaping function that maps the full range of input EDR luminance values to reshaped SDR values.

As discussed earlier, given the final luma forward reshaping function, in an embodiment, the encoder may derive the inverse or backward luma reshaping function (e.g., using equation (24)) and then generate appropriate metadata so that a decoder can reconstruct it. For example, a reverse luma reshaping function may be represented using an n-piece linear or 2-d order non-linear representation (e.g., n=8). Such metadata may be communicated to the decoder as part of the encoded reshaped SDR image.

Refinement of the Chroma-Reshaping Function

As discussed earlier, in STEP 3 (620), chroma reshaping may be adjusted to take into consideration the updated luma reshaping of equation (70). Denote the non-zero pixel count cube as $\Im = \{(\alpha,\beta,\gamma)|h^v(\alpha,\beta,\gamma)>0\}$. Let the number of elements inside $\Im$ be denoted as $|\Im|$. Let $\overline{U}$ denote the matrix that combines all $u(\alpha,\beta,\gamma)$ values with a non-zero pixel count, i.e. $h^v(\alpha,\beta,\gamma)>0$:

$$\overline{U}(\Im) = \begin{bmatrix} \overline{u}(0,0,0) \\ \overline{u}(0,0,1) \\ \vdots \\ \overline{u}(M-1, M-1, M-1) \end{bmatrix}. \qquad (71)$$

It has dimension $|\Im| \times 22$ for $3^{rd}$ order MMR or $|\Im| \times 15$ for $2^{nd}$ order MMR.

The non-zero pixel count reference SDR $\{s_j^{c0}(\alpha,\beta,\gamma)\}$ and $\{s_j^{c1}(\alpha,\beta,\gamma)\}$ cube, can be collected as a matrix $$\overline{s}_j(\alpha,\beta,\gamma) = \begin{bmatrix} s_j^{c0}(\alpha,\beta,\gamma) \\ s_j^{c1}(\alpha,\beta,\gamma) \end{bmatrix}.$$

Hence, let $$\overline{S}_j(\Im) = \begin{bmatrix} \overline{s}_j^T(0,0,0) \\ \overline{s}_j^T(0,0,1) \\ \vdots \\ \overline{s}_j^T(M-1, M-1, M-1) \end{bmatrix} \qquad (72)$$

denote a the $|\Im| \times 2$ matrix of reference SDR data. Then, the refinement of the chroma reshaping mapping can be done based on the minimizing the distortion $$D^{(k),c}(\alpha,\beta,\gamma) = \tilde{D}^{(k),c}((\hat{s}_j^{*(k,\alpha),y}, s_j^y(\alpha,\beta,\gamma)), (s_j^{(0),c0}(\alpha,\beta,\gamma), s_j^{c0}(\alpha,\beta,\gamma)), (s_j^{(0),c1}(\alpha,\beta,\gamma), s_j^{c1}(\alpha,\beta,\gamma))) \qquad (73)$$

Note, that there are $h^v(\alpha,\beta,\gamma)$ pixels at cube $(\alpha,\beta,\gamma)$. In an embodiment, the distortion at cube $(\alpha,\beta,\gamma)$ can be expressed as $$g^{(k)}(\alpha,\beta,\gamma)=h^v(\alpha,\beta,\gamma) \cdot D^{(k),c}(\alpha,\beta,\gamma). \quad (74)$$

The weighting matrix $W^{(k)}$ is a diagonal matrix with dimension $|\mathfrak{I}|\times|\mathfrak{I}|$ and has the following form $$W^{(k)}(\mathfrak{I}) = \begin{bmatrix} g^{(k)}(0,0,0) & \cdots & 0 \\ \vdots & \ddots & \vdots \\ 0 & \cdots & g^{(k)}(M-1,M-1,M-1) \end{bmatrix}. \quad (75)$$

We can formulate this problem as a weighted least squared problem:

$$\arg\min_{M^{F,(k)}} (\bar{S}(\mathfrak{I}) - \bar{U}(\mathfrak{I})M^{F,(k)})^T W^{(k)}(\mathfrak{I})(\bar{S}(\mathfrak{I}) - \bar{U}(\mathfrak{I})M^{F,(k)}), \quad (76)$$

for which the optimal chroma forward reshaping function $M^{F,(k)}$ can be obtained via the least squared solution.

$$M^{F,(k)} = (\bar{U}^T(\mathfrak{I})W^{(k)}(\mathfrak{I})\bar{U}(\mathfrak{I}))^{-1}(\bar{U}^T(\mathfrak{I})W^{(k)}(\mathfrak{I})\bar{S}(\mathfrak{I})). \quad (77)$$

Figure 7:
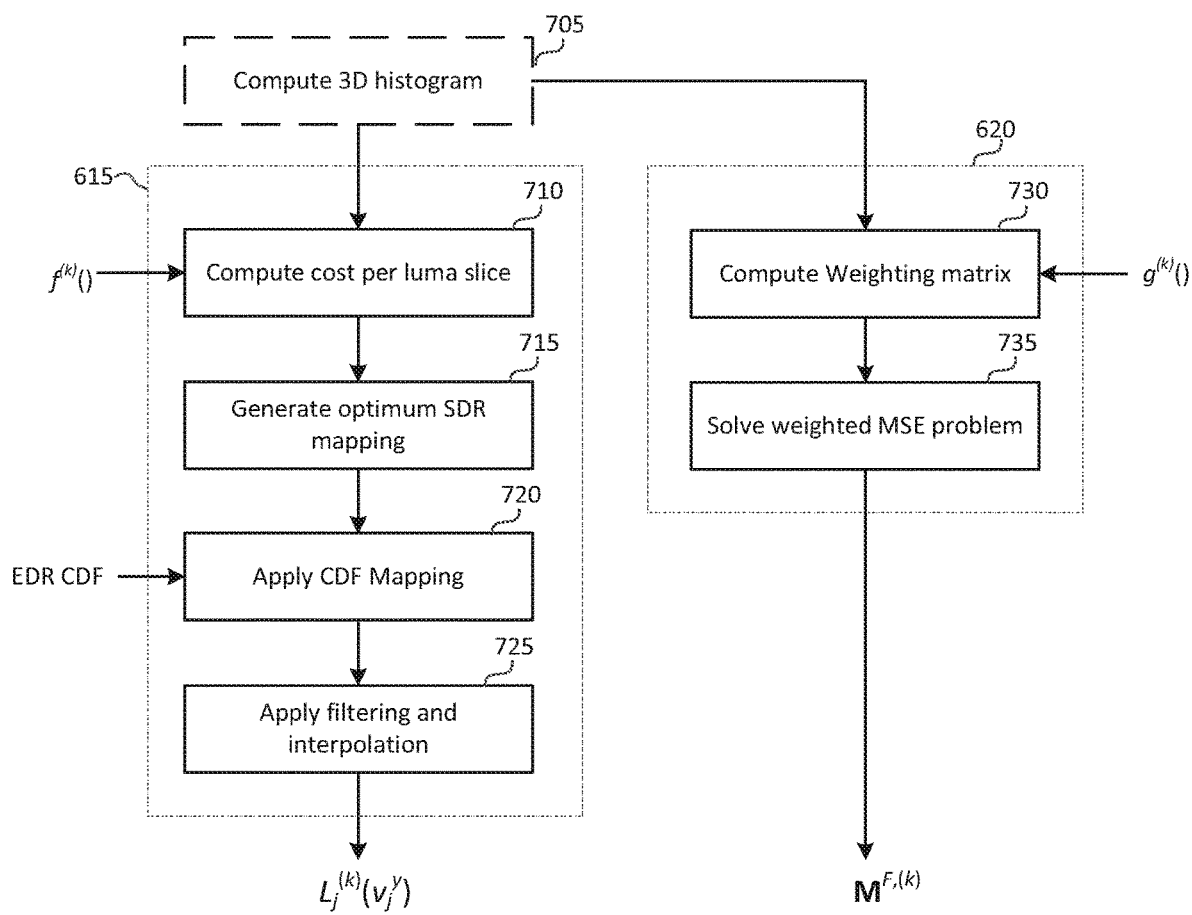
FIG. 7 illustrates an example process for generating refined luma and chroma reshaping mappings according to an embodiment of this invention.

This process is summarized in block (620) of FIG. 7. Given a cost function $g^{(k)}(\alpha,\beta,\gamma)=h^v(\alpha,\beta,\gamma) \cdot D^{(k),c}(\alpha,\beta,\gamma)$, and appropriate inputs, in step (730), the weighting matrix $W^{(k)}$ is constructed (see equation (75)). Then, the parameters $(M^{F,(k)})$ of refined chroma reshaping function are derived by solving a weighted least squares problem (see equation (76)).

Given the final $M^{F,(k)}$ parameters, an encoder can generate appropriate metadata so that a decoder can properly reconstruct the chroma of the output EDR image based on the received SDR image. For example, an encoder may apply equations (32-38) to generate a backward chroma reshaping matrix $M_B^{F,(k)}$ which can be communicated to a decoder using appropriate metadata.

Convergence Considerations

From equation (64b), the total distortion may be measured as $$ET^{(k)} = \sum_{\alpha=0}^{M-1} E^{(k)}(\alpha). \quad (78)$$

In one embodiment, the algorithm may be considered to have converged when that total cost starts increasing instead of decreasing, that is, when $ET^{(k)} > ET^{(k-1)}$. In another embodiment, the algorithm may be considered to have converged when the cost has decreased, but the cost improvement is below a certain threshold. For example, in an embodiment, the algorithm converges when $$\frac{ET^{(k)} - ET^{(k-1)}}{ET^{(k)}} < thr, \quad (79)$$

where thr denotes a threshold that takes into account both the computational resources and desired target quality (e.g., thr=50%).

Fast Algorithm for a Luma Reshaping Function

In equation (63), the distortion metric $\tilde{D}^{(k),y}(.)$ is expressed as a function of both luma and chroma values. In an embodiment, to simplify processing, one may select a distortion metric based only on luminance values. This allows the luma reshaping to be derived based on the input chroma pixel values; however, the chroma reshaping function may be derived independently.

Consider a distortion function $$\tilde{D}^{(k),y}((\hat{s}_j^{(k,\alpha),y}, s_j^y(\alpha,\beta,\gamma)),(\hat{s}_j^{(k-1),c0}(\alpha,\beta,\gamma), s_j^{c0}(\alpha,\beta,\gamma)),$$
$$(\hat{s}_j^{(k-1),c1}(\alpha,\beta,\gamma), s_j^{c1}(\alpha,\beta,\gamma))), = (\hat{s}_j^{(k,\alpha),y} > s_j^y(\alpha,\beta,$$
$$\gamma))?(w^+(\hat{s}_j^{(k,\alpha),y} - s_j^y(\alpha,\beta,\gamma)))^{2\theta}:(w^-(\hat{s}_j^{(k,\alpha),y} - s_j^y(\alpha,\beta,\gamma)))^{2\theta}, \quad (80)$$

where the logical expression: (statement)? (A): (B) denotes: if (statement=True), then do A, else do B, and $w^+$ and $w^-$ are weight factors to improve saturation control (e.g., $w^+=1$ and $w^-=4$). In general, high values of $$\left(\frac{w^-}{w^+}\right)$$

generate darker but also more saturated images.

Consider now a 2D histogram, where the x axis is the bin index for EDR and the y axis is the bin index for SDR. Let $\omega$ and $\xi$ denote the corresponding bin indices, where $0 \leq \omega < M$ and $0 \leq \xi < M$. Using pseudocode, the following algorithm can be used to generate the luma reshaping mapping:

TABLE 1

Fast algorithm to generate a Luma reshaping function

// build the cost function table $$c(x) = (x > 0)?\left(w^+ \cdot \frac{x}{M}\right)^{2\theta} : \left(w^- \cdot \frac{x}{M}\right)^{2\theta} \quad -M \leq x \leq M \quad (t1)$$

// initialization for 2D histogram and cost
$h^{vs}(\omega,\xi) = 0$ for all $(\omega,\xi)$
$R(\omega,\xi) = \text{Inf}$ for all $(\omega,\xi)$
// construct 2D histogram
for each frame j
    for each pixel i in EDR
        find EDR value $(v_{ji}^y, v_{ji}^{c0}, v_{ji}^{c1})$ and co-located SDR pixel value $(s_{ji}^y, s_{ji}^{c0}, s_{ji}^{c1})$
        find bin index for $(v_{ji}^y, s_{ji}^y)$ as $(\omega_{ji}, \xi_{ji})$
        $h^{vs}(\omega_{ji}, \xi_{ji})$++     (t2)
    end
end
// find optimal solution
for( $\omega = 0$ ; $\omega < M$ ; $\omega$++)
    // find min and max (search range) for each EDR value $$s_\omega^{min} = \arg\min_{0 \leq \xi \leq M-1} \{\xi \mid h^{vs}(\omega,\xi) > 0\} \quad (t3)$$

$$s_\omega^{max} = \arg\max_{0 \leq \xi \leq M-1} \{\xi \mid h^{vs}(\omega,\xi) > 0\}$$

// search all valid bins
    for( $\xi = s_\omega^{min}$ ; $\xi \leq s_\omega^{max}$ ; $\xi$++ )
        // compute cost
        T = 0;
        for( k = $s_\omega^{min}$ ; k $\leq s_\omega^{max}$ ; k++ )
            T = T + c(k − $\xi$) · $h^{vs}(\omega,\xi)$;     (t4)
        end
        $R(\omega,\xi)$=T     (t5)
    end
    // find the minimal cost $$\xi^* = \min_{s_\omega^{min} \leq \xi \leq s_\omega^{max}} \{R(\omega,\xi)\} \quad (t6)$$

// find the mapped SDR value from the index $$\hat{s}_j^{*(\omega),y} = \frac{\xi^* + 0.5}{M} \quad (t7)$$

end

The set of $\{\hat{s}_j^{*(\omega),y}\}$ values correspond to the optimal solution based on the single channel weighting.

Figure 8:
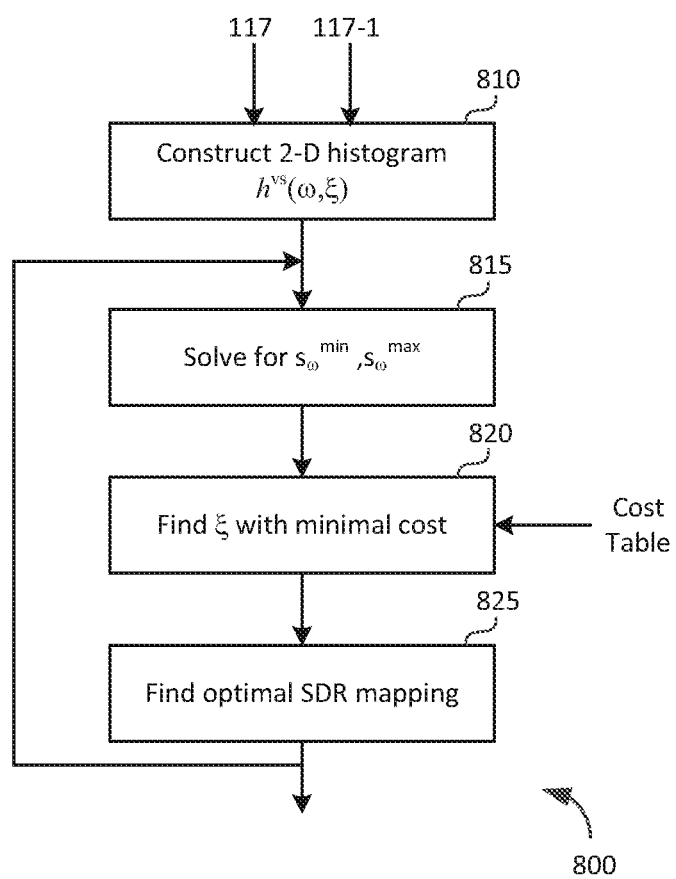
FIG. 8 illustrates an example process for the fast generation of a forward luma reshaping mapping according to an embodiment of this invention.

This process is summarized in FIG. 8 (800). Given input EDR and reference SDR values (117, 117-1), in step (810), a 2D histogram is constructed (see equation (t2)). Then, for each bin ω, steps (815), (820), and (825), are repeated. In step (815), the minimum and maximum reference SDR values are computed (see equation (43)). Given those values and a cost function (see equation (t1)), in step (820), the bin ξ with the minimal total cost is identified (see equations (t4-t6)). Given the optimum bin ξ, then in step (825), the optimal mapping of EDR values in the bin ω may be generated (see equation (t7). As before, the values generated at step (825) may not be monotonically non-decreasing; hence, as before, one may need to apply the CDF mapping (720) and filtering and interpolation steps (725) discussed earlier to generate the final forward luma reshaping function.

In summary, in terms of complexity, from the most computationally complex to the simplest, one may apply the following joint luma-chroma reshaping methods:

Iterative (multi-pass), joint-derivation of luma and chroma reshaping functions (steps 605, 610, 615, 620, 625, and 630)

One-pass joint-derivation of luma and chroma reshaping functions (steps 605, 610, 615, 620, and 630)

One-pass refinement of the luma reshaping function with independent derivation of the chroma reshaping function (steps 605, 610, 615, and 630)

One-pass fast algorithm for the luma reshaping function with independent derivation of the chroma reshaping function (800, 610, and 630)

Cost Function Considerations

For STEP 2 (615), in an embodiment $$\tilde{D}^{(k),y}((\hat{s}_j^{(k,\alpha),y},s_j^{y}(\alpha,\beta,\gamma)),(\hat{s}_j^{(k-1),c0}(\alpha,\beta,\gamma),s_j^{c0}(\alpha,\beta,\gamma)), (\hat{s}_j^{(k-1),c1}(\alpha,\beta,\gamma),s_j^{c1}(\alpha,\beta,\gamma))) = ((\hat{s}_j^{(k,\alpha),y}-s_j^{y}(\alpha,\beta,\gamma))^2+(\hat{s}_j^{(k-1),c0}(\alpha,\beta,\gamma)-s_j^{c0}(\alpha,\beta,\gamma))^2+(\hat{s}_j^{(k-1),c1}(\alpha,\beta,\gamma)-s_j^{c1}(\alpha,\beta\gamma))^2)^\theta, \quad (81)$$

here θ, without limitation, is 2, 4, or 8.

In a simpler implementation, one may consider luminance values only, as in $$\tilde{D}^{(k),y}((\hat{s}_j^{(k,\alpha),y},s_j^{y}(\alpha,\beta,\gamma)),(\hat{s}_j^{(k-1),c0}(\alpha,\beta,\gamma),s_j^{c0}(\alpha,\beta,\gamma)), (\hat{s}_j^{(k-1),c1}(\alpha,\beta,\gamma),s_j^{c1}(\alpha,\beta,\gamma)))=(\hat{s}_j^{(k,\alpha),y}-s_j^{y}(\alpha,\beta,\gamma))^{2\theta}. \quad (82)$$

As noted earlier (see equation (80)), this can be further modified to include weights. In a more generalized version, a weighted distortion function may be expressed as:

if $\hat{s}_j^{(k,\alpha),y}-s_j^{y}(\alpha,\beta,\gamma) \geq 0$ $\tilde{D}^{(k),y}((\hat{s}_j^{(k,\alpha),y},s_j^{y}(\alpha,\beta,\gamma)),(\hat{s}_j^{(k-1),c0}(\alpha,\beta,\gamma),s_j^{c0}(\alpha,\beta,\gamma)), (\hat{s}_j^{(k-1),c1}(\alpha,\beta,\gamma),s_j^{c1}(\alpha,\beta,\gamma)))=(w^+((\hat{s}_j^{(k,\alpha),y}-s_j^{y}(\alpha,\beta,\gamma))^2+(\hat{s}_j^{(k-1),c0}(\alpha,\beta,\gamma)-s_j^{c0}(\alpha,\beta,\gamma))^2+(\hat{s}_j^{(k-1),c1}(\alpha,\beta,\gamma)-s_j^{c1}(\alpha,\beta,\gamma))^2))^\theta$ else $$\tilde{D}^{(k),y}((\hat{s}_j^{(k,\alpha),y},s_j^{y}(\alpha,\beta,\gamma)),(\hat{s}_j^{(k-1),c0}(\alpha,\beta,\gamma),s_j^{c0}(\alpha,\beta,\gamma)), (\hat{s}_j^{(k-1),c1}(\alpha,\beta,\gamma),s_j^{c1}(\alpha,\beta,\gamma))) =(w^-((\hat{s}_j^{(k,\alpha),y}-s_j^{y}(\alpha,\beta,\gamma))^2+(\hat{s}_j^{(k-1),c0}(\alpha,\beta,\gamma)-s_j^{c0}(\alpha,\beta,\gamma))^2+(\hat{s}_j^{(k-1),c1}(\alpha,\beta,\gamma)-s_j^{c1}(\alpha,\beta,\gamma))^2))^\theta \quad (83)$$

Some embodiments may also change the distortion function on a per frame or a per scene basis, based on the overall characteristics of the frame or the scene.

For STEP 3 (620), the following cost functions have exhibited good results:

$$\tilde{D}^{(k),c}((\hat{s}_j^{*(k,\alpha),y},s_j^{y}(\alpha,\beta,\gamma)),(\hat{s}_j^{(k-1),c0}(\alpha,\beta,\gamma),s_j^{c0}(\alpha,\beta,\gamma)), \hat{s}_j^{(k-1),c1}(\alpha,\beta,\gamma),s_j^{c1}(\alpha,\beta,\gamma))) =|(\hat{s}_j^{*(k,\alpha),y}-s_j^{y}(\alpha,\beta,\gamma)|+|\hat{s}_j^{(k-1),c0}(\alpha,\beta,\gamma)-s_j^{c0}(\alpha,\beta,\gamma)|+|\hat{s}_j^{(k-1),c1}(\alpha,\beta,\gamma)-s_j^{c1}(\alpha,\beta,\gamma)|, \quad (84)$$

and $$\tilde{D}^{(k),c}((\hat{s}_j^{(k,\alpha),y},s_j^{y}(\alpha,\beta,\gamma)),(\hat{s}_j^{(k-1),c0}(\alpha,\beta,\gamma),s_j^{c0}(\alpha,\beta,\gamma)), (\hat{s}_j^{(k-1),c1}(\alpha,\beta,\gamma),s_j^{c1}(\alpha,\beta,\gamma))) =(|(\hat{s}_j^{*(k,\alpha),y}-s_j^{y}(\alpha,\beta,\gamma)|+|\hat{s}_j^{(k-1),c0}(\alpha,\beta,\gamma)-s_j^{c0}(\alpha,\beta,\gamma)|+|\hat{s}_j^{(k-1),c1}(\alpha,\beta,\gamma)-s_j^{c1}(\alpha,\beta,\gamma)|)^\theta. \quad (85)$$

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
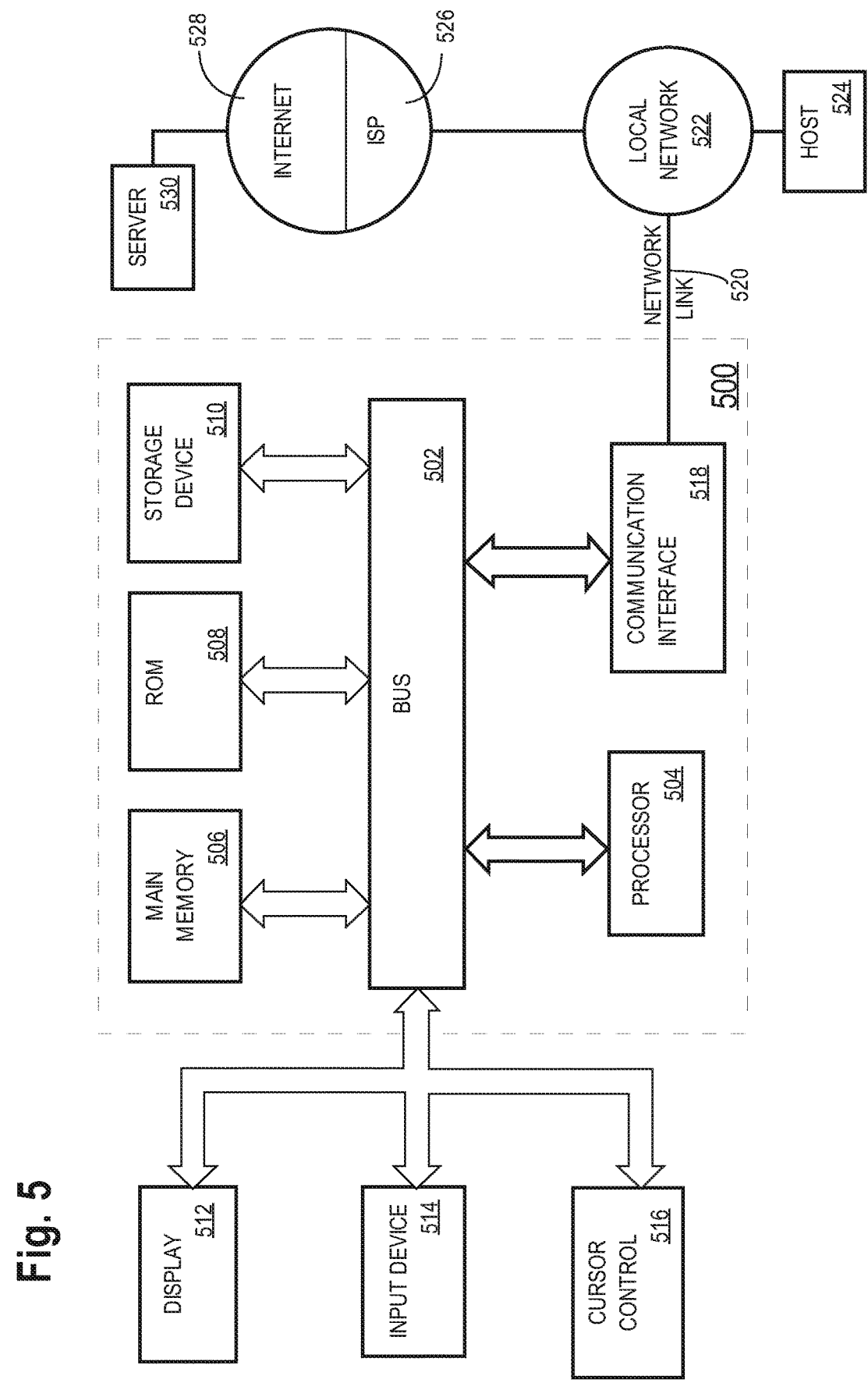
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   determining a tone-mapping function that maps one or more input images of a high dynamic range into one or more reference tone-mapped images of a relatively narrow dynamic range;
   deriving, based on a plurality of first bit depths and a plurality of second bit depths, a luma forward reshaping function for forward reshaping luma codewords of the one or more input images into forward reshaped luma codewords of one or more forward reshaped images of the relatively narrow dynamic range, the one or more forward reshaped images approximating the one or more reference tone-mapped images;
   wherein the luma forward reshaping function differs from the tone-mapping function;
   wherein the plurality of first bit depths is generated based at least in part on noise levels as determined from luma codewords of the one or more input images;
   wherein the plurality of second bit depths is generated based at least in part on the tone mapping function;
   deriving a chroma forward reshaping mapping for predicting chroma codewords of the one or more forward reshaped images, the chroma forward reshaping mapping using chroma codewords and the luma codewords of the one or more input images as input, the chroma forward reshaping mapping using the chroma codewords of the one or more reference tone-mapped images as a prediction target;
   generating backward reshaping metadata that is to be used by one or more recipient devices to generate a luma backward reshaping function and a chroma backward reshaping mapping;
   transmitting the one or more forward reshaped images with the backward reshaping metadata to the one or more recipient devices.

2. The method of claim 1, wherein the plurality of first bit depths is determined in a plurality of codeword bins based on the noise levels, and wherein the plurality of codeword bins covers the high dynamic range.

3. The method of claim 1, wherein the plurality of second bit depths is determined in a plurality of codeword bins based on the tone-mapping function, and wherein the plurality of codeword bins covers the high dynamic range.

4. The method of claim 1, wherein the chroma forward reshaping mapping is derived by optimizing a cost function constructed with the chroma codewords and the luma codewords of the one or more input images as the input and the chroma codewords of the one or more reference tone-mapped images as the prediction target.

5. The method of claim 1, wherein the one or more forward reshaped images are encoded in a video signal of the relatively narrow dynamic range, and wherein the backward reshaping metadata is carried in the video signal as metadata separate from the one or more forward reshaped image.

6. The method of claim 5, wherein the video signal excludes one or both of the one or more input images or the one or more reference tone-mapped images.

7. The method of claim 1, further comprising downsampling the luma codewords of the one or more input images before the luma codewords of the one or more input images are used as a part of the input for deriving the chroma forward reshaping mapping.

8. The method of claim 1, wherein the one or more input images are represented in a different color space than that in which the one or more reference tone-mapped images are represented.

9. The method of claim 1, wherein the one or more input images are formatted in a different sampling format than that in which the one or more reference tone-mapped images are formatted.

10. The method of claim 1, wherein at least one of the one or more input images or the one or more reference tone-mapped images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

11. The method of claim 1, wherein the luma forward reshaping function is constructed based on a plurality of third bit depths; wherein the plurality of third bit depths is derived based on the plurality of first bit depths and the plurality of second bit depths; wherein each third bit depth in the plurality of third bit depths corresponds to a respective first bit depth in the plurality of first bit depths and a respective second bit depth in the plurality of second bit depths; and wherein each third bit depth in the plurality of third bit depths is not less than a respective first bit depth in the plurality of first bit depths and no more than a respective second bit depth in the plurality of second bit depths.

12. The method of claim 1, wherein the chroma backward reshaping mapping is generated for predicting chroma codewords of one or more backward reshaped images that approximate the one or more input images, the chroma backward reshaping mapping using the chroma codewords and the luma codewords of the one or more forward reshaped images as input, the chroma backward reshaping mapping using the chroma codewords of the one or more input images as a prediction target.

13. The method of claim 1, further comprising:
   applying a scaling factor for controlling color saturation to the chroma codewords of the one or more reference tone-mapped images;
   generating the chroma forward reshaping function based at least in part on the chroma codewords, after having been applied with the scaling factor, of the one or more reference tone-mapped images.

14. The method of claim 1, further comprising:
   determining a chroma forward reshaping cost function and a chroma backward reshaping cost function both of which are dependent on a scaling factor, the chroma forward reshaping cost function being used to generate the chroma forward reshaping mapping, the chroma backward reshaping cost function being used to generate the chroma backward reshaping mapping;

searching for an optimized value of the scaling factor that minimizes a distortion between one or more reconstructed images generated based at least in part on the chroma backward reshaping mapping and the one or more input images.

15. An apparatus comprising a processor and configured to perform the method recited in claim 1.

16. A non-transitory computer-readable storage medium having stored thereon computer-executable instruction for executing a method with one or more processors in accordance with claim 1.

* * * * *